(12) United States Patent
Yamato et al.

(10) Patent No.: US 8,713,087 B2
(45) Date of Patent: Apr. 29, 2014

(54) COMMUNICATION SYSTEM, AUTHENTICATION DEVICE, CONTROL SERVER, COMMUNICATION METHOD, AND PROGRAM

(75) Inventors: Junichi Yamato, Tokyo (JP); Toshio Koide, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 13/137,172

(22) Filed: Jul. 25, 2011

(65) Prior Publication Data
US 2011/0314517 A1  Dec. 22, 2011

Related U.S. Application Data

(63) Continuation of application No. PCT/JP2010/073428, filed on Dec. 24, 2010.

(30) Foreign Application Priority Data

Jan. 4, 2010  (JP) ................................. 2010-000053

(51) Int. Cl.
*G06F 15/16* (2006.01)
*G06F 15/173* (2006.01)

(52) U.S. Cl.
USPC .......................................... 709/200; 709/238

(58) Field of Classification Search
USPC ............................................................. 726/3
See application file for complete search history.

(56) References Cited

U.S. PATENT DOCUMENTS

| | | | |
|---|---|---|---|
| 2002/0103885 A1* | 8/2002 | Hamada ........................ | 709/219 |
| 2005/0144289 A1* | 6/2005 | Yoshiuchi et al. ............ | 709/227 |
| 2006/0005254 A1* | 1/2006 | Ross .............................. | 726/27 |
| 2006/0190721 A1 | 8/2006 | Kawakami et al. | |
| 2007/0011262 A1 | 1/2007 | Kitani et al. | |

FOREIGN PATENT DOCUMENTS

| | | |
|---|---|---|
| JP | 2004-318582 A | 11/2004 |
| JP | 2006-115059 A | 4/2006 |
| JP | 2006-229836 A | 8/2006 |
| JP | 2007-5847 A | 1/2007 |
| JP | 2008-278006 A | 11/2008 |

OTHER PUBLICATIONS

Nick McKeown, and 7 others, 'OpenFlow: Enabling Innovation in Campus Networks', [online], [search conducted Dec. 14, 2009] Internet URL: http://www.openflowswitch.org//documents/openflow-wp-latest.pdf, Mar. 14, 2008.

'OpenFlow: Switch Specification' Version 0.9.0. (Wire Protocol 0x98), [search conducted Dec. 14, 2009] Internet URL: http://www.openflowswitch.org/documents/openflow-spec-v0.9.0.pdf, Jul. 20, 2009.

* cited by examiner

*Primary Examiner* — John B. Walsh
(74) *Attorney, Agent, or Firm* — McGinn IP Law Group, PLLC

(57) ABSTRACT

A forwarding node processes a packet between a supplicant and a prescribed authentication device, in accordance with a processing rule that has been set. The authentication device performs a prescribed authentication procedure with the supplicant and notifies a result thereof to a control server. In a case where an authentication procedure with the authentication device succeeds, the control server creates a first forwarding path between the supplicant and a destination node, and transmits a processing rule for a packet received or transmitted between the supplicant and a destination node, following the first forwarding path, in at least one forwarding node in the first forwarding path.

8 Claims, 23 Drawing Sheets

FIG. 6

| USER | PASSWORD | ACCESS POLICY |
|------|----------|---------------|
| AAA | ******** | COMMUNICATION ALLOWED WITH HOST (XXX.XXX.XXX.XXX.) |
| BBB | ******** | COMMUNICATION ALLOWED WITH HOST (YYY.YYY.YYY.YYY) |
| .. | .. | .. |

FIG. 23   RELATED ART

| ACTION NAME | ACTION CONTENT |
|---|---|
| OUTPUT | OUTPUT TO SPECIFIED PORT |
| SET_VLAN_VID | ADD/UPDATE VLAN TAG BY SPECIFIED VLAN ID |
| SET_VLAN_PCP | ADD/UPDATE VLAN TAG BY SPECIFIED VLAN PRIORITY |
| STRIP_VLAN | RELEASE IEEE 802.1Q VLAN TAG |
| SET_DL_SRC | UPDATE MAC SA |
| SET_DL_DST | UPDATE MAC DA |
| SET_NW_SRC | UPDATE IP SA |
| SET_NW_DST | UPDATE IP DA |
| SET_TP_SRC | UPDATE TCP/UDP SOURCE PORT |
| SET_TP_DST | UPDATE TCP/UDP DESTINATION PORT |
| ENQUEUE | UPDATE TCP/UDP DESTINATION PORT |
| VENDOR | VENDOR DEFINED ACTION |

US 8,713,087 B2

COMMUNICATION SYSTEM, AUTHENTICATION DEVICE, CONTROL SERVER, COMMUNICATION METHOD, AND PROGRAM

DESCRIPTION OF RELATED APPLICATION

This application is a continuation of International Application No. PCT/JP2010/073428, filed on Dec. 24, 2010, claiming priority of Japanese Patent Application No. 2010-000053, filed on Jan. 4, 2010, both disclosures of which are incorporated herein by reference in their entireties.

TECHNICAL FIELD

The present invention relates to a communication system, an authentication device, a control server, a communication method, and a computer program, and in particular, relates to a communication system, nodes, a control server, a communication method, and a computer program, for realizing communication by forwarding a packet by forwarding nodes arranged in a network.

BACKGROUND ART

IEEE 802.1x is known as one authentication standard for performing authentication via a network. In IEEE 802.1x, as shown in FIG. 20, a configuration is known where a switch 901 provided with an authenticator function cooperates with an Authentication Server 900 and performs access control. Furthermore, as shown in FIG. 21, a configuration is known where, in an initial state (an unauthenticated state), an EAPoL (Extensible Authentication Protocol over LAN) pass switch 904 that only passes EAPoL frames is arranged, and access to the Authenticator 901 is allowed.

It is to be noted that, as shown in FIG. 22, with an EAPoL frame, identification is possible according to a value of a TYPE field of a MAC frame being "888E", and identification of message type is possible according to a value of a Ptype field. For example, if the value of the Ptype field is "0", identification that this is an EAP packet is performed, and if the value of the Ptype field is "1", identification is made of an EAPoL Start message.

In recent years, technology known as OpenFlow has been proposed (Non-Patent Document 1). In OpenFlow, communication is taken as end-to-end flow, and path control, recovery from failure, load balancing, and optimization are performed in flow units. An OpenFlow switch functioning as a forwarding node is provided with a secure channel for communication with an OpenFlow controller, and operates according to a flow table in which appropriate addition or rewriting is instructed by an OpenFlow controller. In the flow table are definitions of sets of rules (FlowKey) for collation with packet headers, actions (Actions) defining processing content, and flow statistical information (Stats), for each flow (refer to FIG. 4).

FIG. 23 shows an example of action names and action content defined in Non-Patent Document 2. OUTPUT is an action for outputting to a specific port (interface). From SET_VLAN_VID to SET_TP_DST are actions for correcting fields of a packet header.

For example, when an OpenFlow switch receives a packet, an entry is searched for that has a rule (FlowKey) matching header information of the received packet, from the flow table. As a result of the search, in a case where an entry matching the received packet is found, the OpenFlow switch implements processing content described in an action field of the entry in question, for the received packet. On the other hand, as a result of the search, in a case where an entry matching the received packet is not found, the OpenFlow switch forwards the received packet to the OpenFlow controller via a secure channel, requests determination of a path of the packet based on source and destination of the received packet, receives a flow entry for realizing this, and updates the flow table.

Non-Patent Document 1

Nick McKeown, and 7 others, 'OpenFlow: Enabling Innovation in Campus Networks', [online], [search conducted Dec. 14, 2009] Internet URL: http://www.openflowswitch.org//documents/openflow-wp-latest.pdf Non-Patent Document 2

'OpenFlow: Switch Specification' Version 0.9.0. (Wire Protocol 0x98), [search conducted Dec. 14, 2009] Internet URL: http://www.openflowswitch.org/documents/openflow-spec-v0.9.0.pdf The disclosures of the abovementioned Non-Patent Documents are incorporated herein by reference thereto. The following analysis is given by the present inventors.

In a case where access control according to a user is performed in a network configured by an OpenFlow switch as described above, there is a problem in that it is necessary to arrange an Authenticator as shown in FIG. 20 or, as shown in FIG. 21, a switch for passing flow related to authentication at a required number of locations.

With regard to this point, Non-Patent Document 1 stops at describing, in Examples 1 and 2 of "3.2 More Examples" thereof, that an authentication function is provided to the above-mentioned OpenFlow controller, and in this way it is possible to configure a virtual network equivalent to a VLAN.

The present invention has been made in light of the above-mentioned circumstances, and it is an object thereof to provide a communication system that can perform access control for each user/client, without arranging an Authenticator or an EAPoL pass switch at each location.

According to a first aspect of the present invention, there is provided a communication system including: a forwarding node that executes processing a packet between a supplicant and a prescribed authentication device, in accordance with a set processing rule; an authentication device that performs a prescribed authentication procedure with the supplicant, and gives notification of a result thereof to a control server; and a control server that creates a first forwarding path between the supplicant and a destination node, in a case where an authentication procedure with the authentication device succeeds, and sets a processing rule for a packet received or transmitted between the supplicant and the destination node following the first forwarding path, in at least one forwarding node in the first forwarding path.

According to a second aspect of the present invention, there is provided an authentication device, connected to a forwarding node that processes a packet between a supplicant and a prescribed authentication device in accordance with a set processing rule, and a control server that sets the processing rule in the forwarding node; wherein the authentication device performs a prescribed authentication procedure with the supplicant via the forwarding node and gives notification of a result thereof to the control server.

According to a third aspect of the present invention, there is provided a control server, connected to a forwarding node that executes processing a packet between a supplicant and a prescribed authentication device, in accordance with a set processing rule, and an authentication device that performs a prescribed authentication procedure with the supplicant via the forwarding node, and gives notification of a result thereof to a control server; wherein the control server creates a first forwarding path between the supplicant and a destination node, in a case where an authentication procedure with the authentication device succeeds, and sets a processing rule for a packet received or transmitted between the supplicant and the destination node following the first forwarding path, in at least one forwarding node in the first forwarding path.

According to a fourth aspect of the present invention, there is provided a communication method including: by a forwarding node processing a packet between a supplicant and a prescribed authentication device, in accordance with a set processing rule; by the authentication device performing a prescribed authentication procedure with the supplicant, and gives notification of a result thereof to a control server; and by the control server creating a first forwarding path between the supplicant and a destination node, in a case where an authentication procedure with the authentication device succeeds, and setting a processing rule of a packet received or transmitted between the supplicant and the destination node following the first forwarding path, in at least one forwarding node in the first forwarding path. The present method is linked with specific instruments, known as an authentication device and a control server that performs flow control.

According to a fifth aspect of the present invention, there is provided a program to be executed on a computer forming a control server that controls the authentication device and forwarding node as described above.

According to a sixth aspect, there is provided a computer program to be executed on a computer forming an authentication device as disclosed hereinabove.

It is to be noted that the program can be recorded in computer readable storage medium. That is, the present invention can be embodied as a computer program product. Also the program may be regarded as either a program product (i.e. manufacture) or a process embodying the load distribution method (process), expressed in a program language.

The meritorious effects of the present invention are summarized as follows. According to the present invention, it is possible to perform access control for each user/client, without arranging an Authenticator, an EAPoL pass switch or the like at each location. A reason for this is that a configuration is used in which a packet that includes information that this is an authentication packet is transmitted to an authentication device, and under a condition of successful authentication, a control server performs creation and setting of a forwarding path.

BRIEF DESCRIPTION OF THE DRAWINGS

FIG. 6 is an example of authentication data held in an Authentication Server of the first exemplary embodiment of the present invention;
FIG. 23 is a diagram showing an example of actions executed by an OpenFlow switch.

PREFERRED MODES

Figure 1:
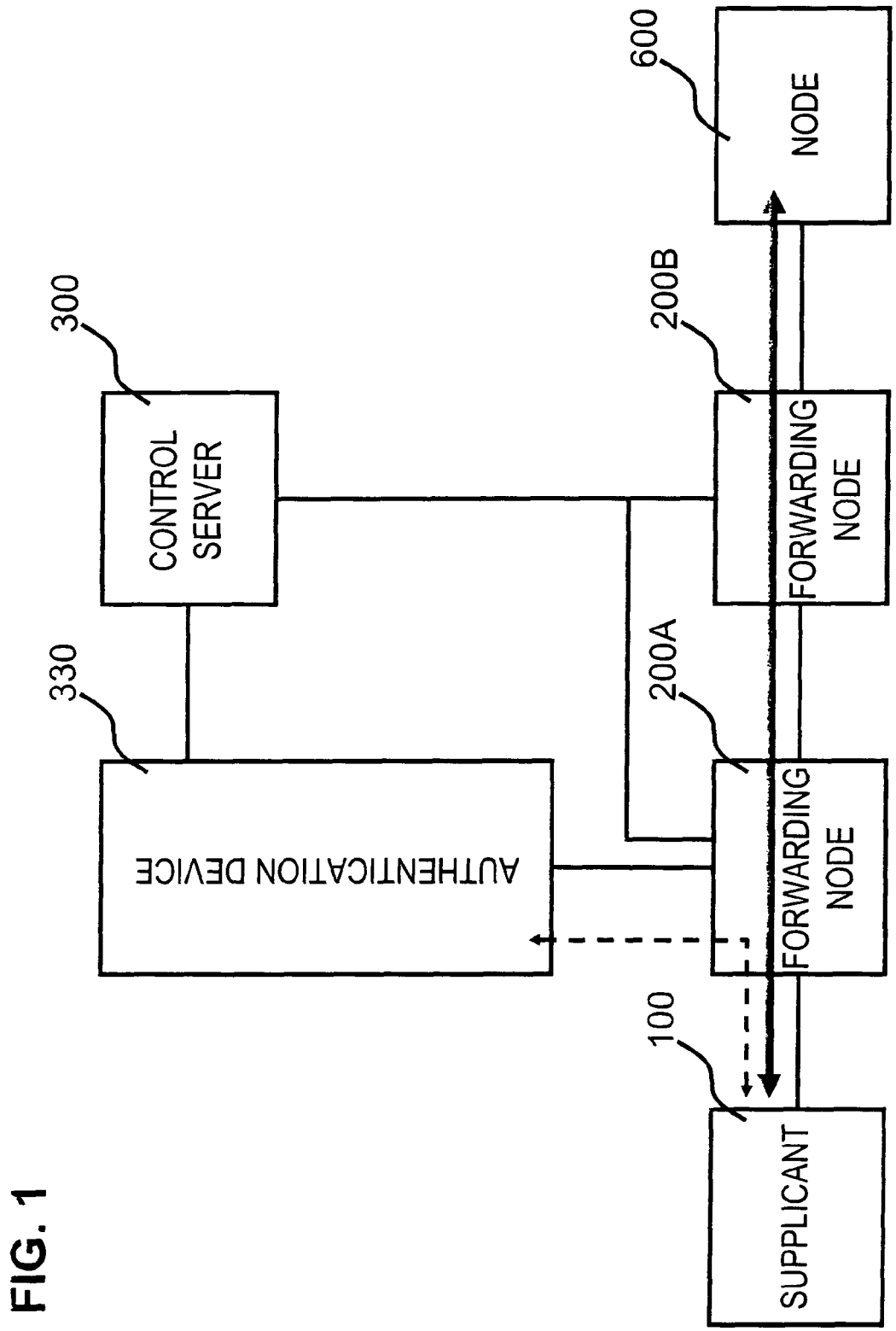
FIG. 1 is a diagram for describing an outline of the present invention.

First, an outline of an exemplary embodiment of the present invention is described. A communication system according to an exemplary embodiment of present invention, as shown in FIG. 1, is configured by including: a forwarding node 200A for relaying a packet that includes information that this is an authentication packet, following a second forwarding path (broken line in FIG. 1) between a supplicant 100 and a prescribed authentication device 330; the authentication device 330 for performing prescribed authentication procedure with the supplicant 100 via the second forwarding path (broken line in FIG. 1), and notifying a result thereof to a control server 300; and the control server 300 for creating a first forwarding path (thick solid line in FIG. 1) between the supplicant 100 and a destination node 600, in a case where the supplicant 100 succeeds in an authentication procedure with the authentication device 330, and relaying a packet received or transmitted between the supplicant 100 and the destination node 600 following the first forwarding path (thick solid line in FIG. 1), to forwarding nodes 200A and 200B on the first forwarding path (thick solid line in FIG. 1). It is to be noted that reference symbols in the drawings noted in this outline are examples shown solely in order to assist understanding, and are not intended to limit modes of the drawings.

The forwarding nodes 200A and 200B and the control server 300 can be realized by an OpenFlow switch and an OpenFlow controller of Non-Patent Documents 1 and 2, respectively. Furthermore, as a mechanism for forwarding authentication flow to the authentication device 330, a method (refer to FIG. 7 to FIG. 9) in which the control server 300, which receives a request to set a path of a packet that includes information that this is an authentication packet, from the forwarding node 200A (or 200B), on a case-by-case basis prescribes a forwarding path with regard to the authentication flow in question, and a method (refer to FIG. 7 and FIG. 9) in which a processing rule (flow entry) realizing the forwarding path in question is set in advance, can be considered.

Figure 11:
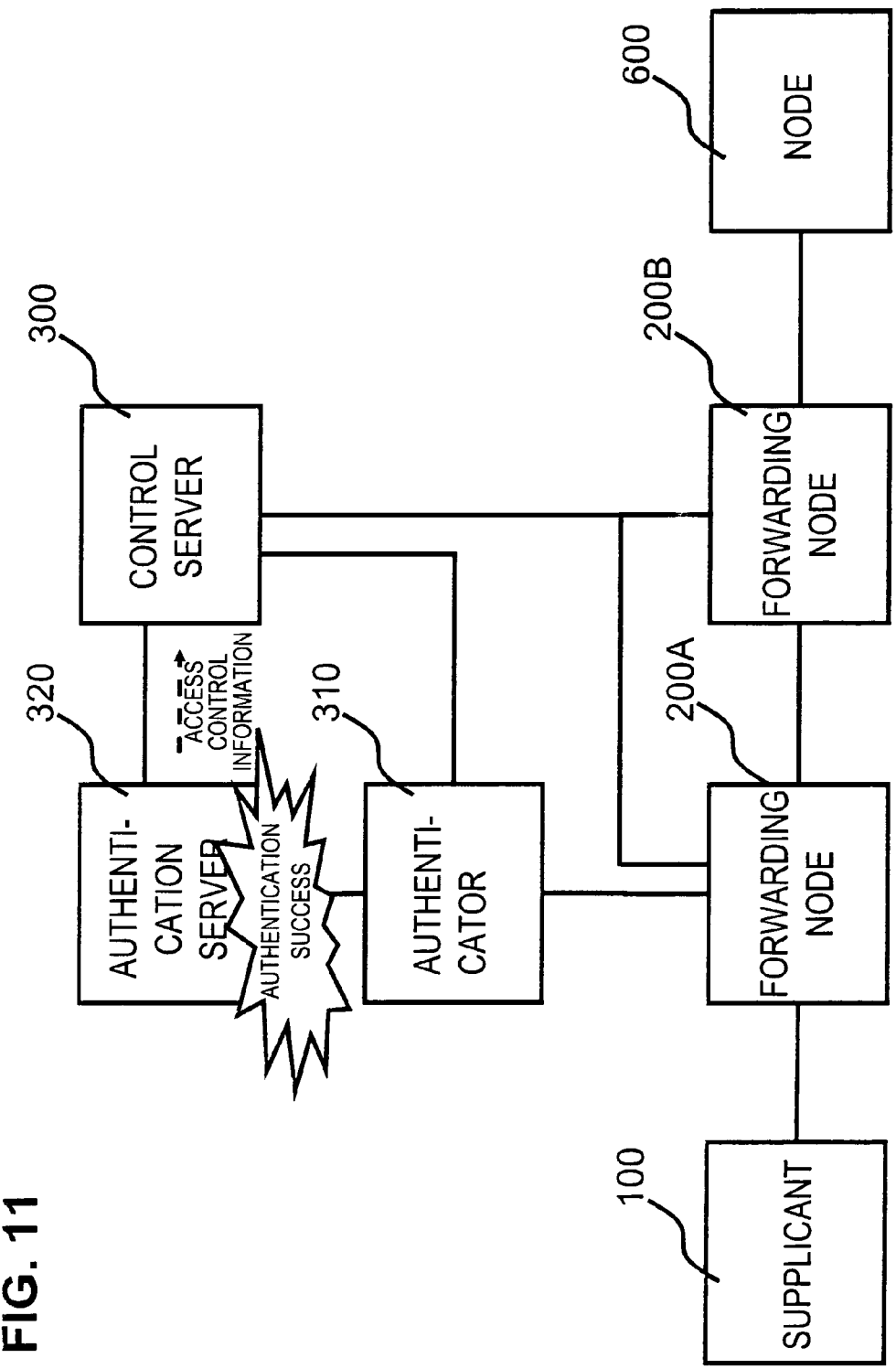
FIG. 11 is a continuing diagram of FIG. 9.

The authentication device 330 that receives an authentication packet executes an authentication procedure with the supplicant 100 and notifies the control server 300 of a result thereof (refer to FIG. 11). In accordance with a result of the authentication procedure, the control server 300 determines whether or not to set the first forwarding path (thick solid line in FIG. 1) between the supplicant 100 and the destination node 600. For example, in a case of success in the authentication procedure, the control server 300 creates a forwarding path (thick solid line in FIG. 1) between the supplicant 100 and the destination node 600, and notifies (specifies) a processing rule (flow entry) that realizes the forwarding path in question to the forwarding nodes 200A and 200B that are on the forwarding path in question.

Figure 20:
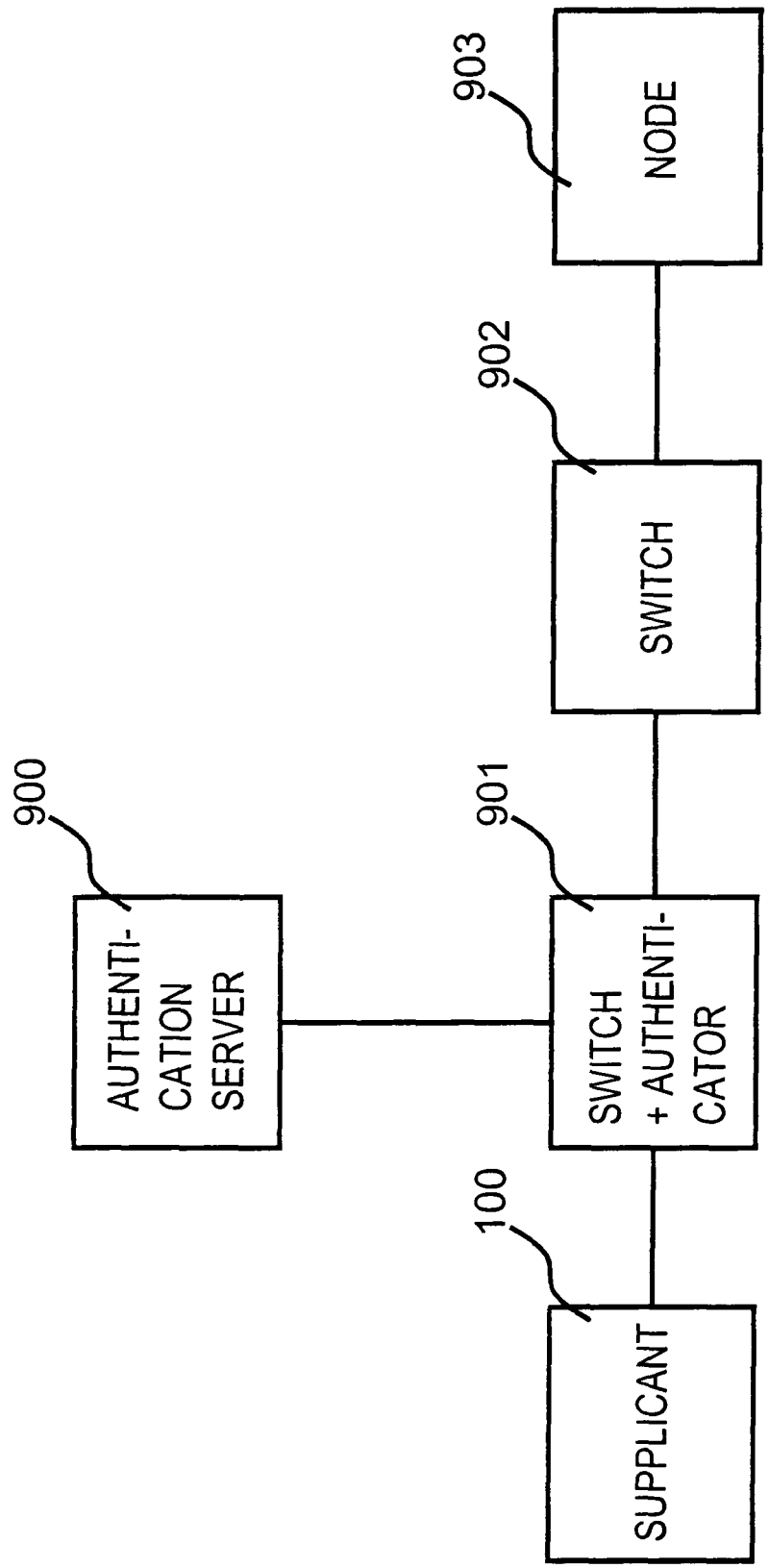
FIG. 20 is an example of an authentication network using IEEE 802.1x.
Figure 21:
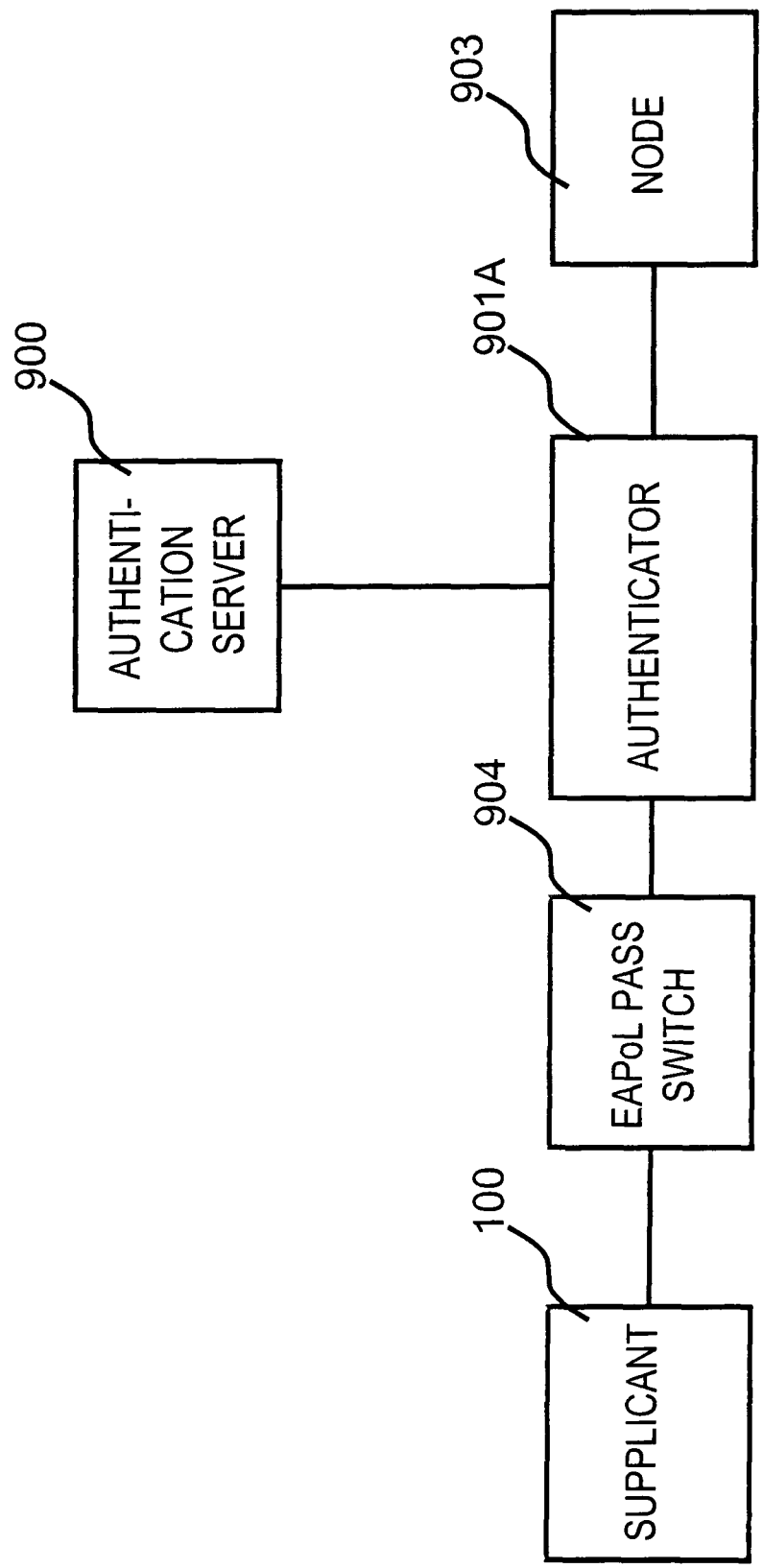
FIG. 21 is another example of an authentication network using IEEE 802.1x.
Figure 22:
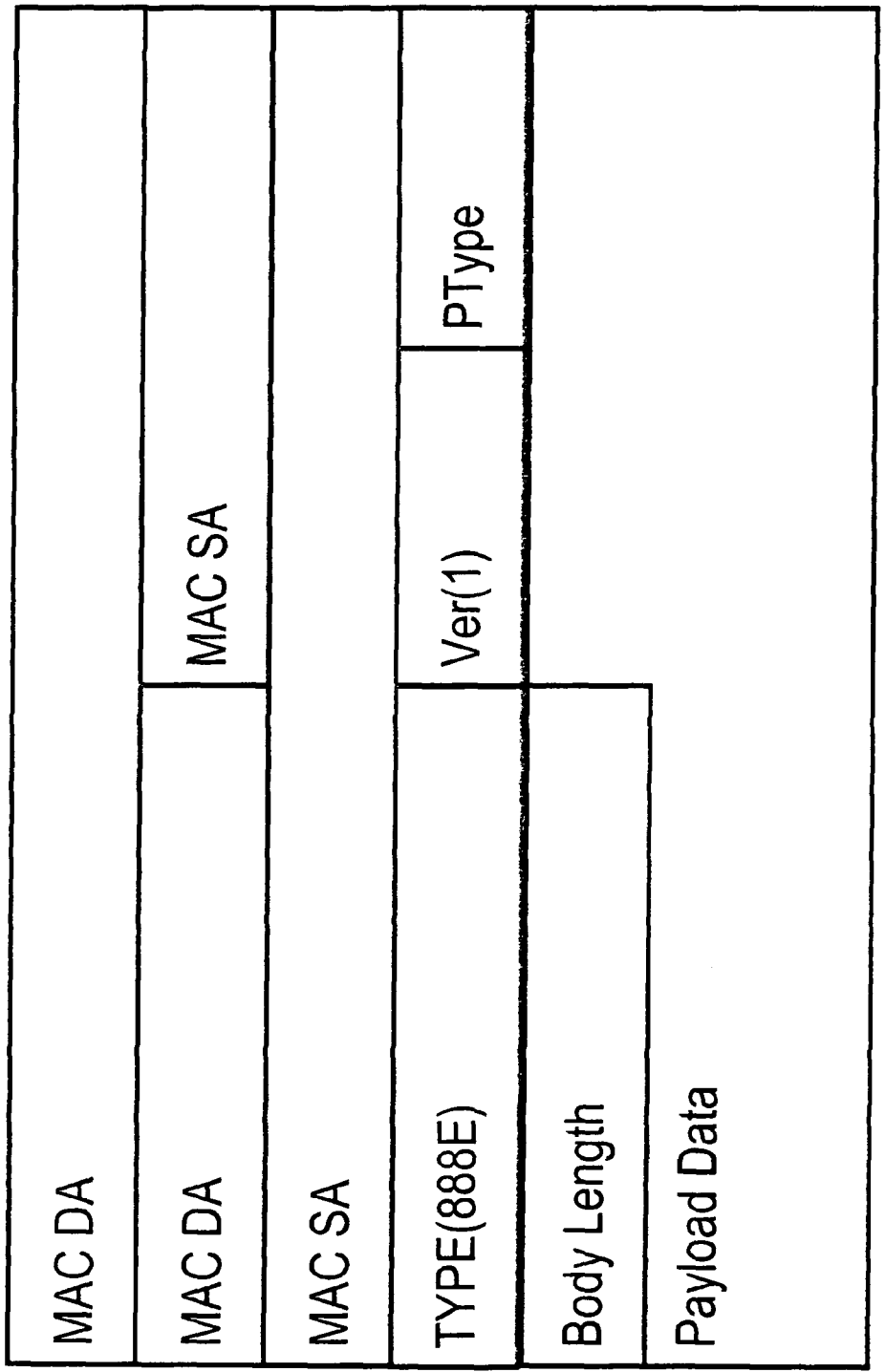
FIG. 22 is a diagram representing a configuration of an EAPoL frame.

From the above, using a forwarding node that performs a packet forwarding operation based on the processing rule (flow entry), it is possible to perform an authentication process in the same way as a configuration of FIG. 20 and FIG. 21, and to perform detailed access control thereafter.

The following modes are possible in the present invention.
(Mode 1)
As in the communication system described in the first aspect.
(Mode 2)
The forwarding node preferably has a function unit that forwards a received packet for which a processing rule is unknown to the control server, and the control server creates a second forwarding path between the supplicant and the prescribed authentication device, in a case where a packet transmitted from the forwarding node includes information that this is an authentication packet, and thereafter transmits a processing rule to be applied by the forwarding node for an authentication packet received or transmitted between a supplicant and a prescribed authentication device, to at least a forwarding node that is a source of the forwarded packet.
(Mode 3)
The authentication device preferably transmits an access policy or an access control list, as a notification of the authentication result, to the control server, and the control server preferably uses the access policy or access control list to determine whether or not to create a first forwarding path for a packet for which an enquiry was received from the forwarding device.
(Mode 4)
The authentication device is preferably configured by an Authentication Server, and an Authenticator that executes an authentication procedure with the Authentication Server instead of the supplicant, based on a message received from the supplicant.
(Mode 5)
The second forwarding path is preferably a path via a control server, and the control server preferably also participates in relaying the authentication packet.
(Mode 6)
The authentication device, in a case of receiving a connection release request from the supplicant, preferably gives notification thereof to the control server, and the control server that receives the notification preferably gives an instruction to delete a processing rule corresponding to the first forwarding path created for a packet from the supplicant, to a forwarding node on the first forwarding path.

(Mode 7)
As in the authentication device described in the second aspect.
(Mode 8)
As in the control server described in the third aspect.
(Mode 9)
As in the communication method described in the fourth aspect.
(Mode 10)
As in each program described in the fifth aspect and the sixth aspect.

It is to be noted that the authentication device, the control server, the communication method, and the program, as described in the abovementioned second to fifth aspects, similar to the communication system of Mode 1, can be expanded to content of Mode 2 to Mode 6.
(First Exemplary Embodiment)

Figure 2:
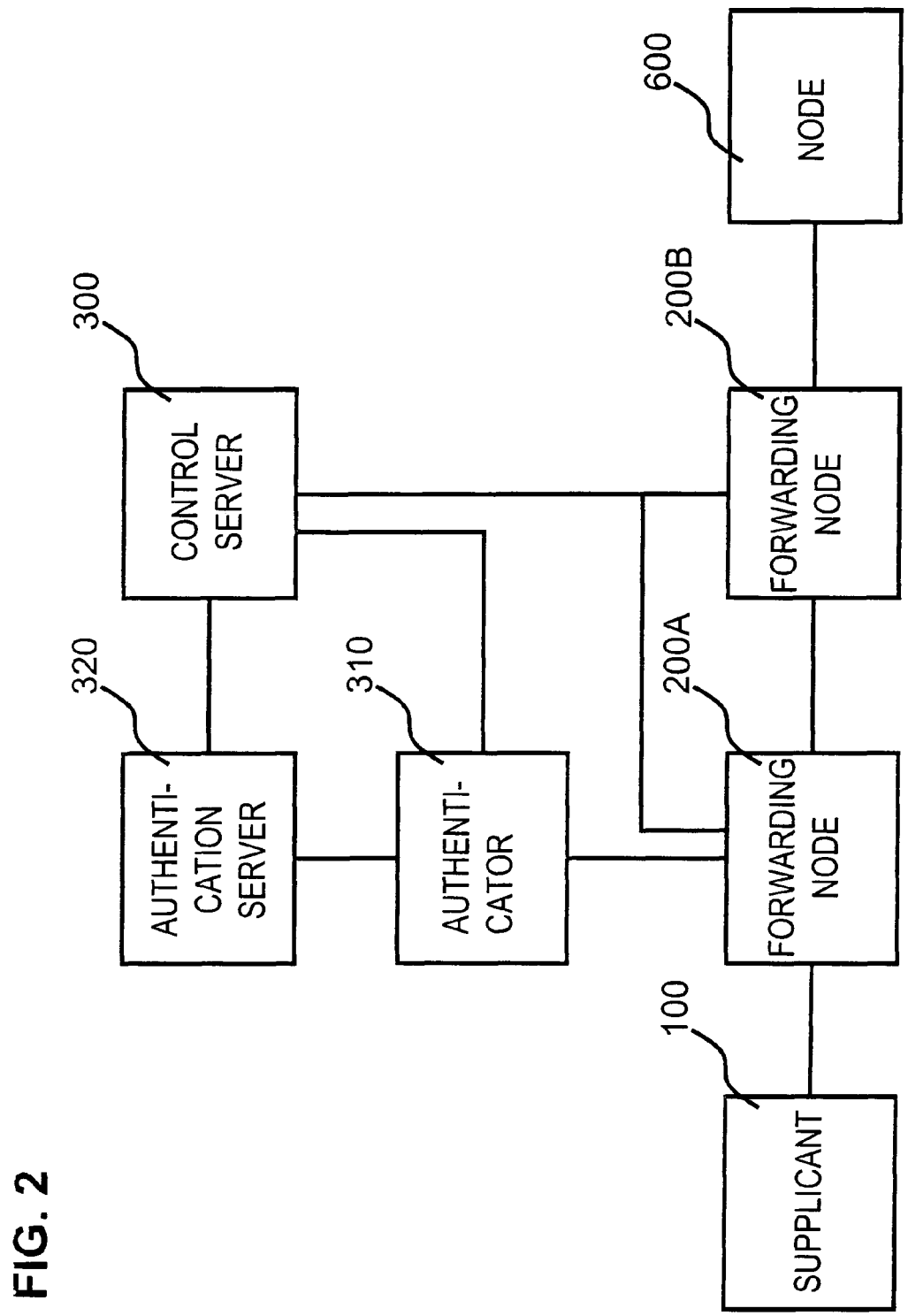
FIG. 2 is a block diagram representing a configuration of a first exemplary embodiment of the present invention.

Next, a detailed description is given concerning a first exemplary embodiment of the present invention, making reference to the drawings. FIG. 2 is a block diagram representing a configuration of the first exemplary embodiment of the present invention. Referring to FIG. 2, a plurality of forwarding nodes 200A and 200B connecting a supplicant 100 and a node 600, and arranged according to a prescribed network topology, a control server 300 for controlling the forwarding nodes 200A and 200B, an Authenticator 310, and an Authentication Server 320 that are each connected to the control server 300 are shown. It is to be noted that in an example of FIG. 1, two of the forwarding nodes 200A and 200B are shown, but this is to simplify the description, and the number of forwarding nodes is not limited to two.

Figure 3:
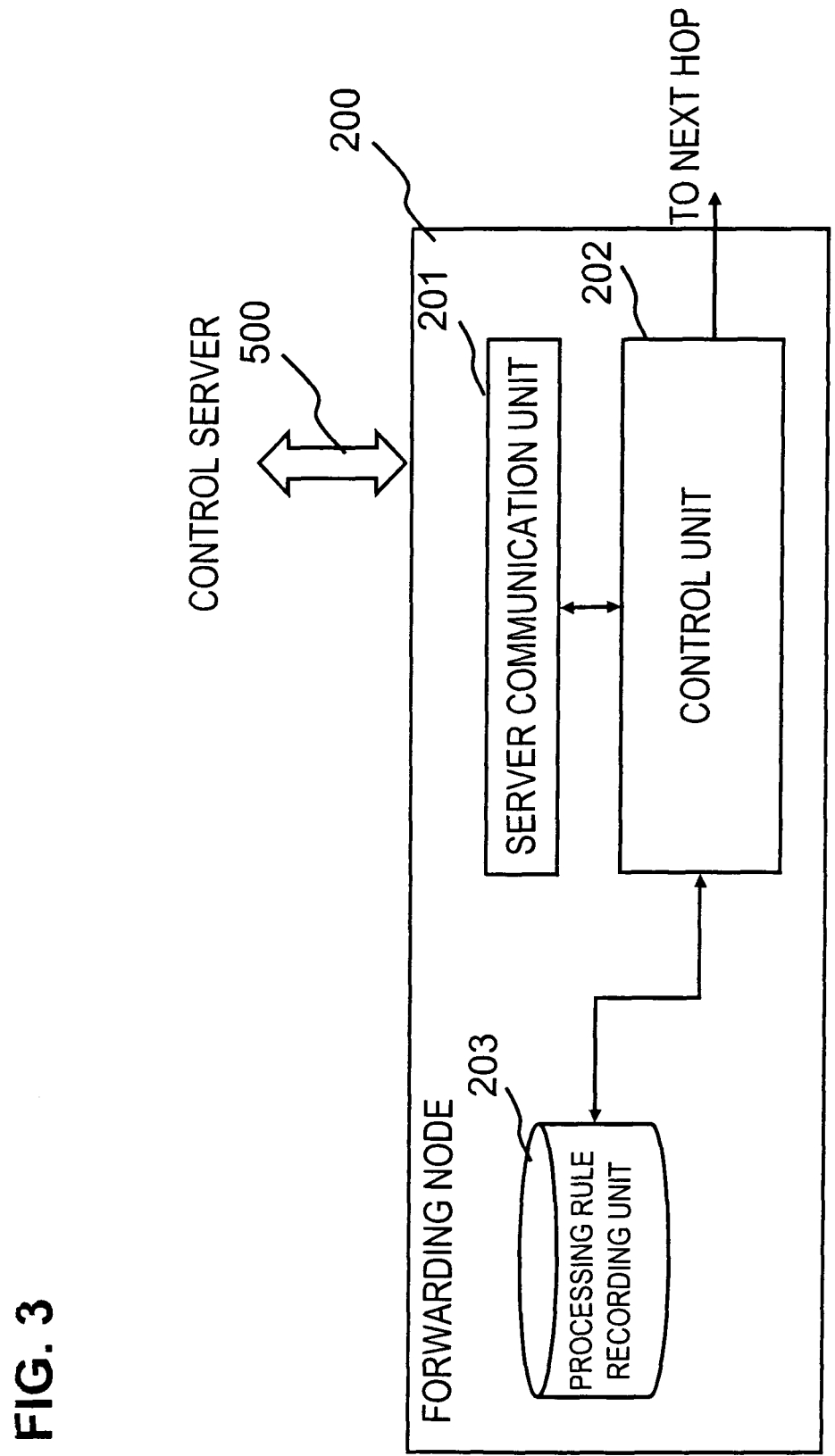
FIG. 3 is a block diagram representing a configuration of a forwarding node of the first exemplary embodiment of the present invention.

FIG. 3 is a block diagram representing a configuration of the forwarding nodes 200A and 200B (below, where there is no particular distinction between the forwarding nodes, reference is made to a forwarding node 200). Referring to FIG. 3, the forwarding node 200 is configured by being provided with a server communication unit 201 for communicating with the control server 300 via a dedicated secure channel 500, and a control unit 202 that refers to a procesing rule recorded in a processing rule recording unit 203, to forward a received packet, or make a request to the control server 300 to create a forwarding path that forwards a received packet for which a processing rule is unknown, set a processing rule, and the like.

Figure 4:
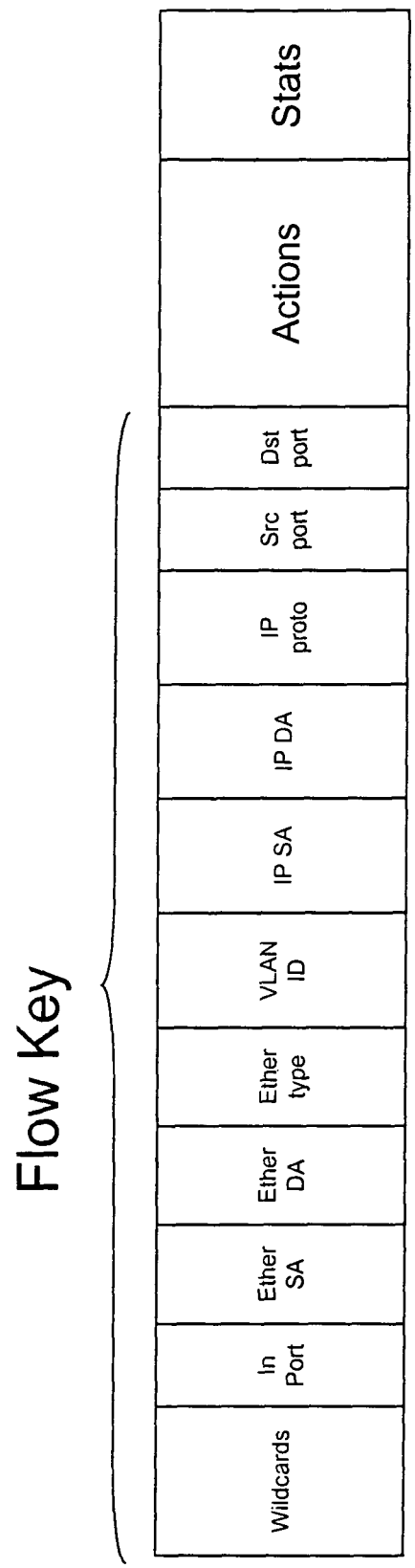
FIG. 4 is an example of information recorded in a processing rule recording unit of the forwarding node of the first exemplary embodiment of the present invention.

FIG. 4 is a configuration example of a processing rule recorded in the processing rule recording unit 203 of the above-mentioned forwarding node 200, and is equivalent to a flow entry recorded in an OpenFlow table of Non-Patent Documents 1 and 2. In a case of using this type of processing rule, the forwarding node 200 searches for an entry having a FlowKey matching a header of the received packet, from the processing rule recording unit 203, and executes an action described in an Actions field (of variable length). Furthermore, similar to a flow entry in OpenFlow, it is possible to set a validity time for each processing rule. Furthermore, with regard to processing content, in a case of content equivalent to OpenFlow of Non-Patent Documents 1 and 2, by setting "OUTPUT" of FIG. 23 as an action, it is possible to forward the received packet from a specified interface (port). Otherwise, by setting various types of action of FIG. 23, or having the Actions field empty, it is possible to change a MAC address or an IP address of a specific flow, or to drop a specific flow.

For example, with regard to a packet whose destination address (IP DA) is a specific node (the Authenticator 310 or the node 600 of FIG. 1), by respectively setting a processing rule executing a forwarding action to a subsequent hop in a forwarding path in each forwarding node 200, packet forwarding to the specific node in question is implemented. In the same way, with regard to a packet directed from the specific node in question (the Authenticator 310 or the node 600 of FIG. 1) to a user (supplicant 100 shown in FIG. 1), by setting a processing rule executing a forwarding action in a reverse direction in each forwarding node 200, packet forwarding in a reverse direction is implemented.

Figure 5:
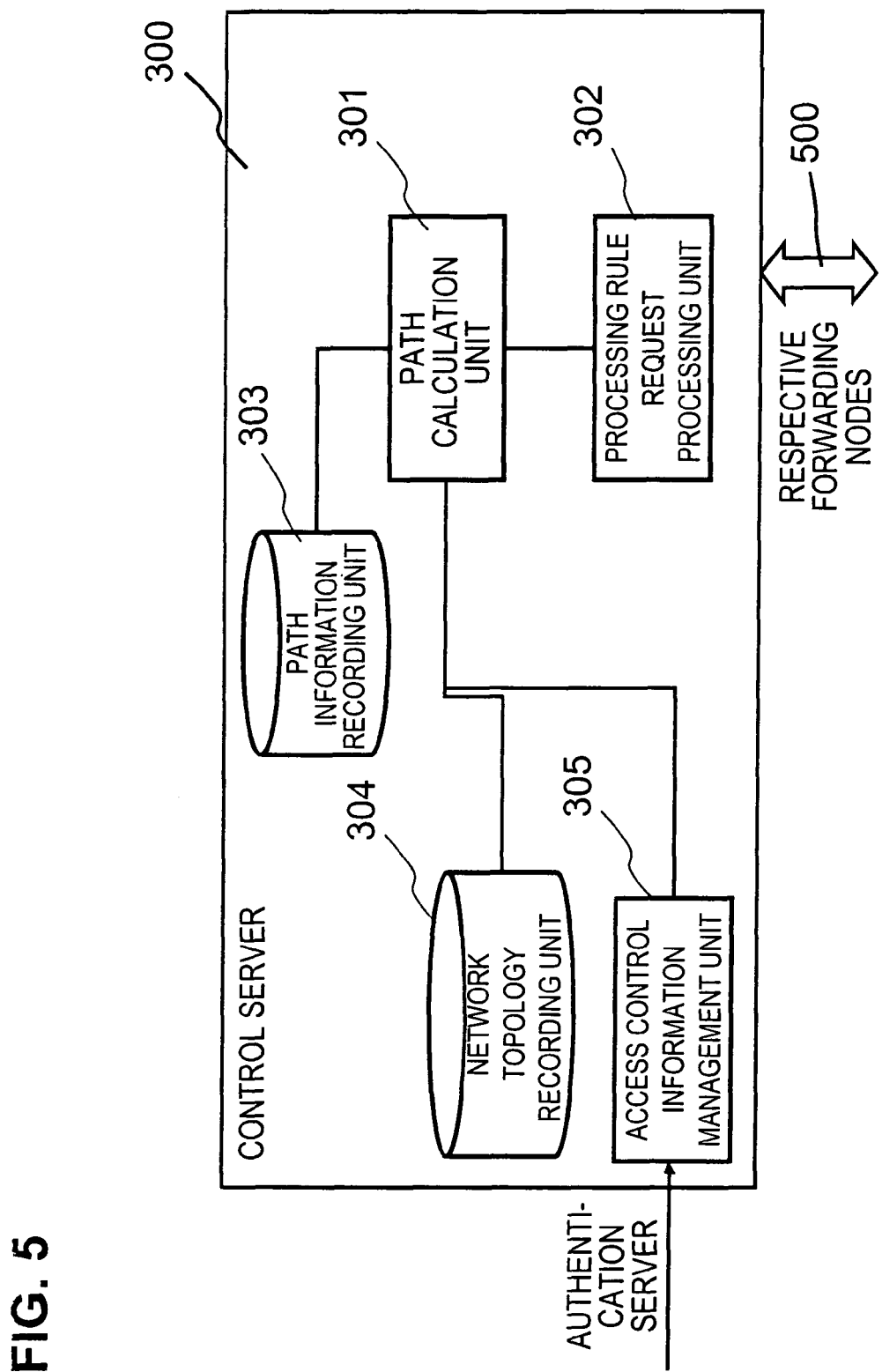
FIG. 5 is a block diagram representing a configuration of a control server of a first exemplary embodiment of the present invention.

FIG. 5 is a block diagram representing a configuration of the control server 300. Referring to FIG. 5, the control server 300 is configured by being provided with a processing rule request processing unit 302 that receives a request to set a processing rule from respective forwarding nodes 200 via the channel 500, and sets a processing rule by transmitting the processing rule, a path calculating unit 301 that refers to network topology recorded in a network topology recording unit 304 and access control information recorded in an access control information management unit 305, calculates a forwarding path of a packet for which a path setting request has been received, and creates a processing rule corresponding to the forwarding path in question, and a path information recording unit 303 for recording the created forwarding path information. Furthermore, with regard to a packet including an EAPoL Start frame, the path calculating unit 301 creates a processing rule for realizing a forwarding path from the supplicant 100 to the Authenticator 310. It is to be noted that the path calculating unit 301 and the processing rule request processing unit 302 of the control server 300 can also be realized by a computer program that executes respective processes in a computer forming the control server 300.

The Authenticator 310 is a device that replaces a header and the like of an authentication message between the supplicant 100 and the Authentication Server 320, and performs relay processing. For example, in a case where the Authentication Server 320 is a RADIUS (or DIAMETER) server corresponding to IEEE 802.1x, it is possible to use a switch corresponding to IEEE 802.1x.

The Authentication Server 320 holds authentication information such as a password and access control information set in advance for each user (refer to FIG. 6), executes an authentication procedure, and in a case where the authentication is successful, gives notification of access control information to the control server 300. A detailed description of the access control information is given later.

Furthermore, the Authentication Server 320, on receiving a connection release request from a user, gives notification to that effect to the control server 300. The control server 300 that receives the notification deletes the access control information of the user in question, held in the access control information management unit 305, and also extracts a forwarding path for the user in question recorded in the path information recording unit 303, and instructs the forwarding node 200 in the forwarding path in question to delete a processing rule corresponding to the forwarding path in question. According to the above, there is a return to a state before authentication.

It is to be noted that the access control information notified by the Authentication Server 320 describes a port group and subnet service allowing connection, for each user identified by a MAC address or the like, and, for example, it is possible to have an access policy or an access control list (ACL) mode. For example, as shown in FIG. 6, various access policies are set, determining content such as permission/prohibition of communication with a specific host, permission/prohibition of communication with a specific port, permission/prohibition of communication with a specific subnet, and permission/prohibition of communication with an external network.

The control server 300 refers to the access control information to determine whether or not to create a forwarding path of a packet for which a request to set a path has been received.

Next, a detailed description is given concerning operation of the present exemplary embodiment, making reference to the drawings. It is to be noted that, in the following description, a processing rule for forwarding an EAPoL frame to the Authenticator 310 is not set in advance in the respective forwarding nodes 200A and 200B. In a case where a processing rule for forwarding an EAPoL frame to the Authenticator 310 is set in advance, it is possible to omit a procedure up to recording the processing rule description below. Furthermore, in the following, a description is given in which the supplicant 100 receives authentication and transmits a packet to the node 600.

Figure 7:
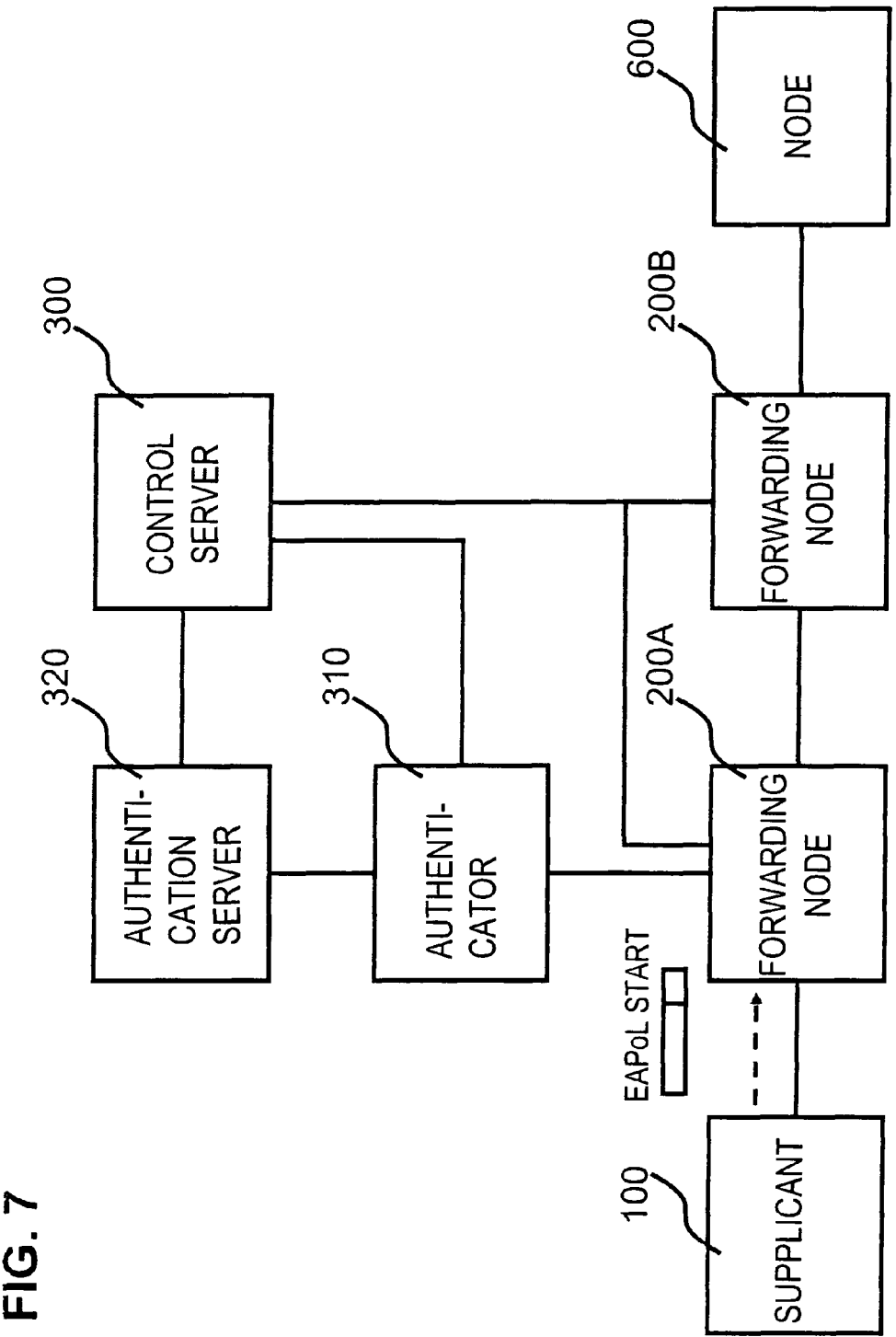
FIG. 7 is a diagram for describing operation (until authentication success) in the first exemplary embodiment of the present invention.

FIG. 7 shows a state in which the supplicant 1000 transmits a packet including an EAPoL Start frame. At this point in time, a processing rule matching the packet including the EAPoL Start frame is not set in the forwarding node 200A.

Figure 8:
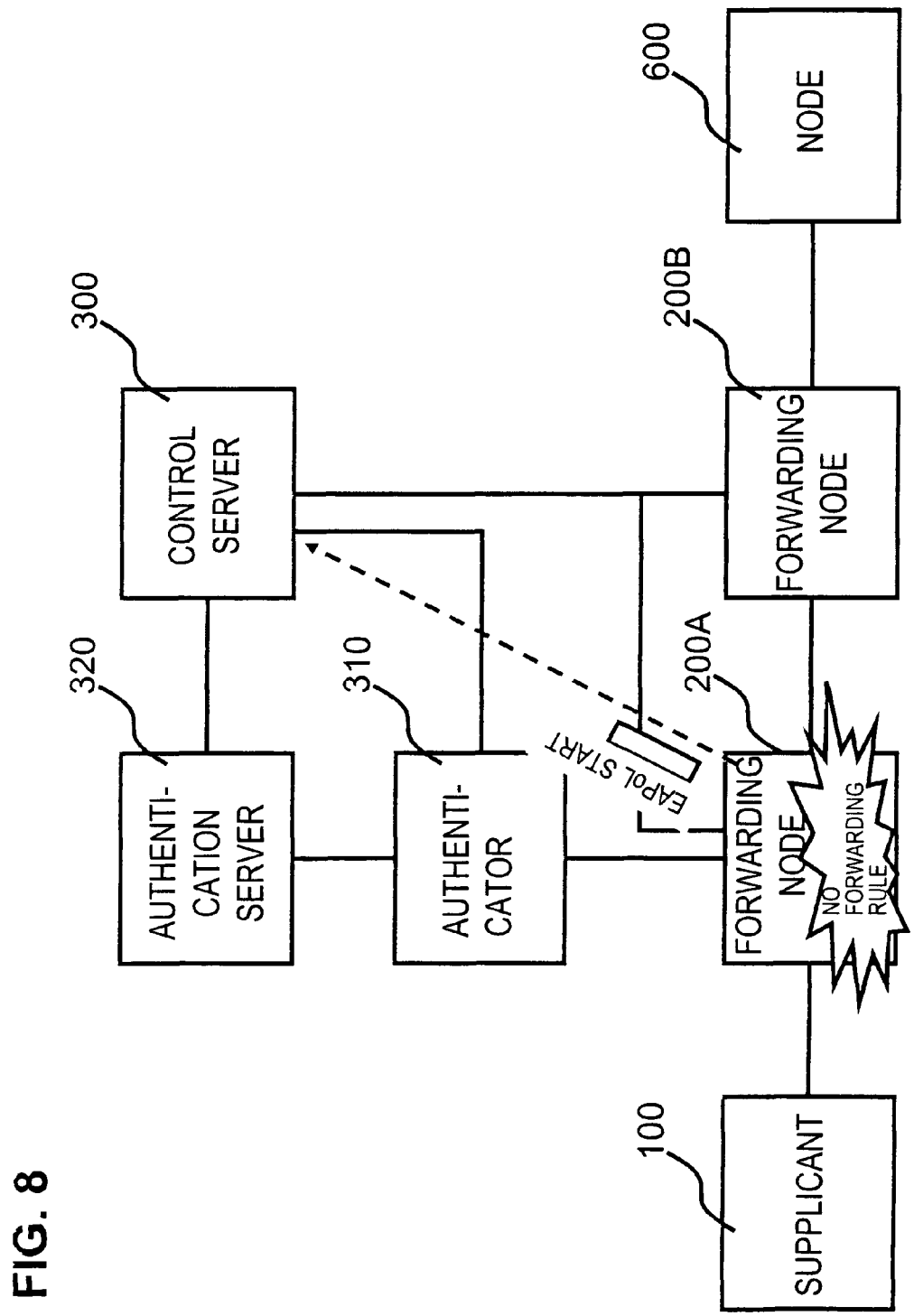
FIG. 8 is a continuing diagram of FIG. 6.

As a result, the forwarding node 200A that receives the packet, as shown in FIG. 8, transmits the packet including the EAPoL Start frame to the control server 300, creates a path, and requests setting of a processing rule.

The control server 300 that receives the request to set the processing rule determines that this is a packet including the EAPoL Start frame, from a value of a TYPE field of a MAC frame of the packet, and creates a processing rule for realizing a forwarding path from the supplicant 100 to the Authenticator 310.

Here, a forwarding path (second forwarding path; refer to FIG. 1) in the order of the supplicant 100, the forwarding node 200A, and the Authenticator 310 of FIG. 8, is created. At this time, with respect to the forwarding node 200A on the left side of FIG. 8, the control server 300, in a case of receiving a packet including an EAPoL frame (TYPE field=888E) from the supplicant 100, creates a processing rule determining an action for forwarding from a port connected to the Authenticator 310, and in a case of receiving a packet including an EAPoL frame (TYPE field=888E) from the Authenticator 310 with a destination of the supplicant 100, creates a processing rule determining an action for forwarding with a destination of the supplicant 100 (using Ether DA of FIG. 4).

It is to be noted that the forwarding node 200A and the Authenticator 310 of FIG. 8 are directly connected, but a third forwarding node may be arranged between the two. In this case, by setting a processing rule relaying through both thereof, it is possible to relay a packet including the EAPoL frame in the third forwarding node also.

Figure 9:
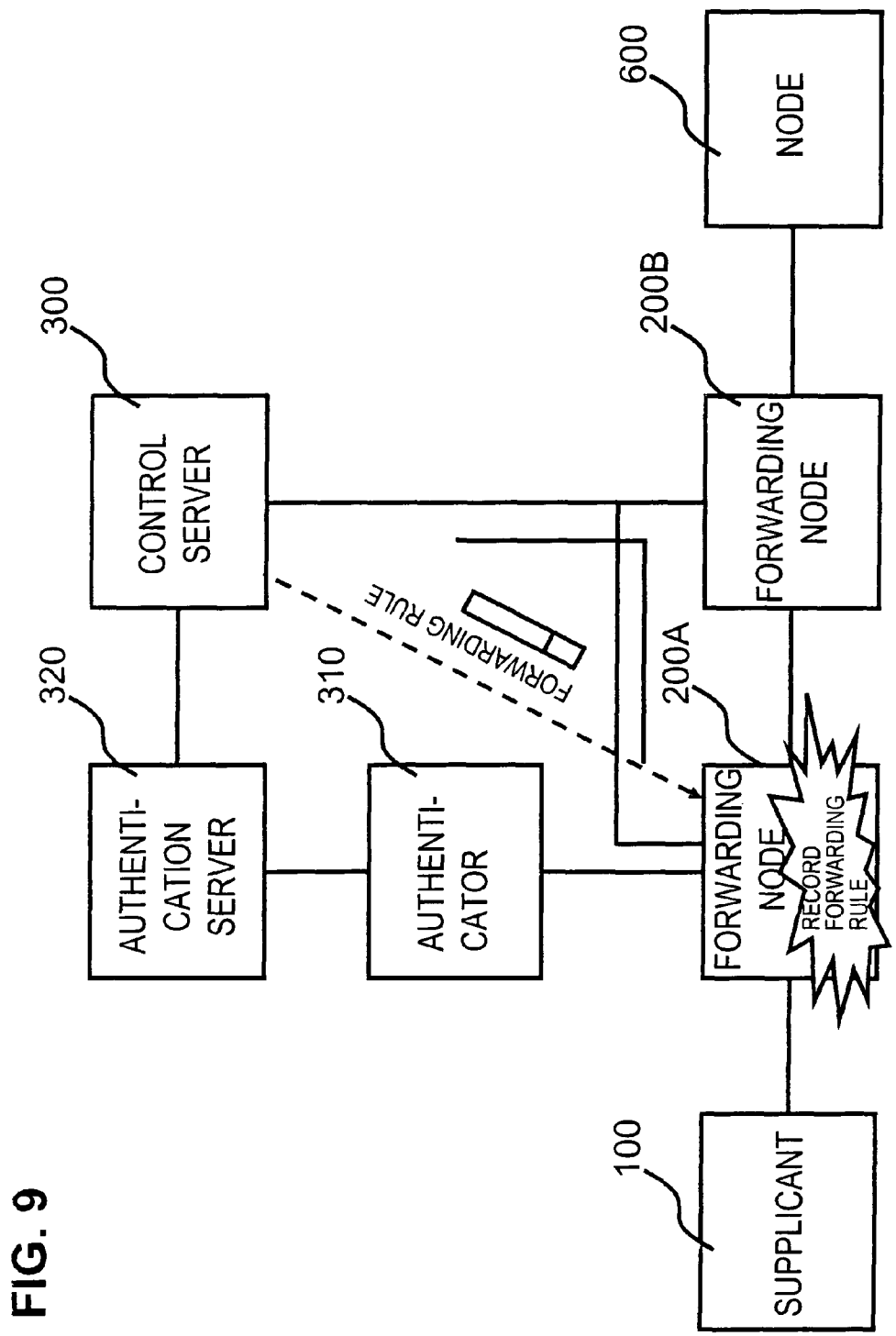
FIG. 9 is a continuing diagram of FIG. 7.

As shown in FIG. 9, when the control server 300 transmits the processing rule created as described above to the forwarding node 200A, the forwarding node 200A records the received processing rule in the processing rule recording unit 203, and also transmits a packet including an EAPoL Start frame received from the supplicant 100 to the Authenticator 310.

Figure 10:
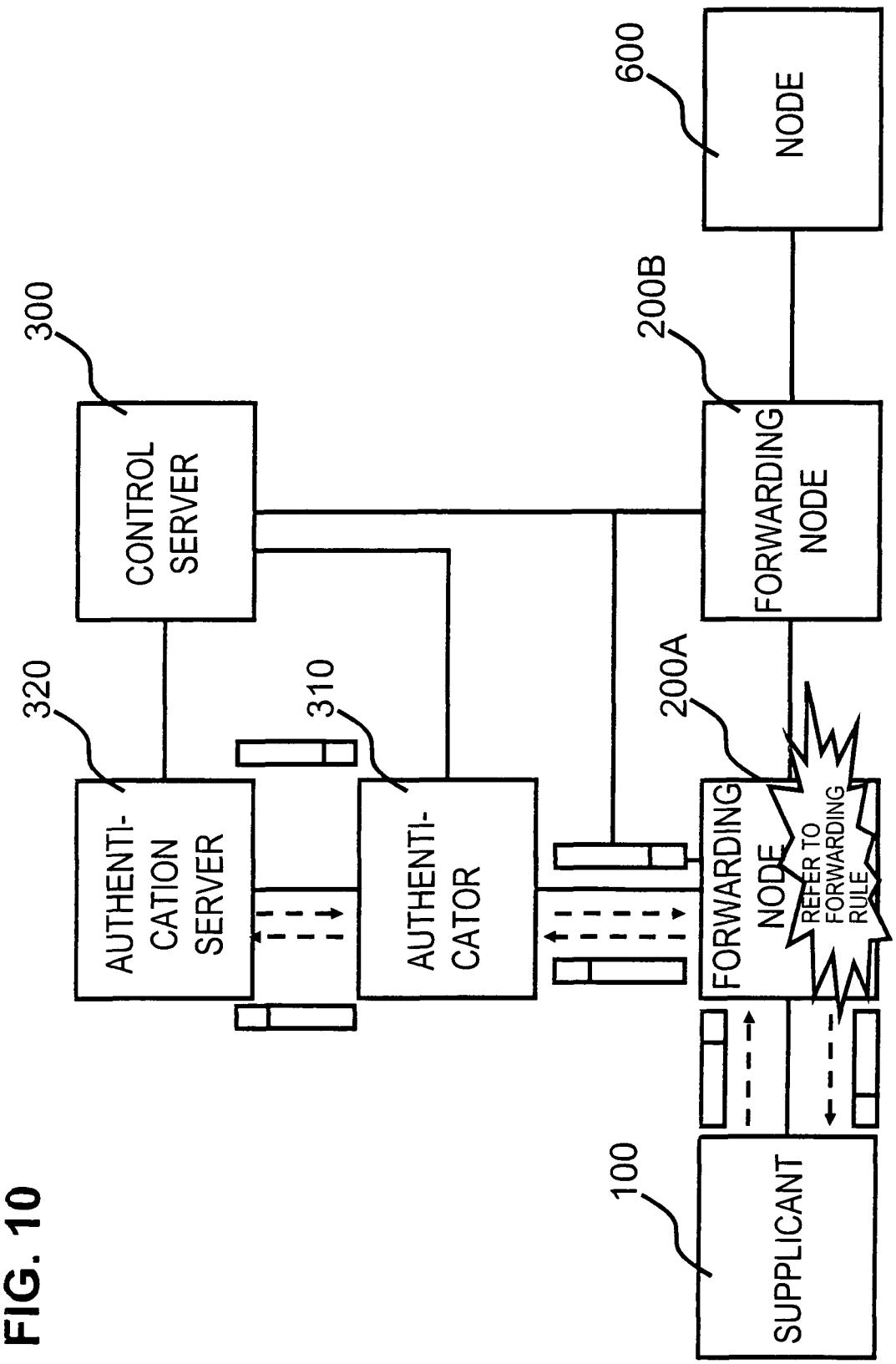
FIG. 10 is a continuing diagram of FIG. 8.

Below, as shown in FIG. 10, an authentication procedure is executed between the supplicant 100 and the Authenticator 310, and the Authenticator 310 and the Authentication Server 320, via the forwarding node 200A where the processing rule is recorded.

In the authentication procedure, various types of method can be used, but an example is cited as described below in which authentication with a RADIUS server succeeds, using an OTP (One Time Password).

supplicant 100=> Authenticator 310:
EAPoL-Start
Authenticator 310=> supplicant 100:

EAP-REQUEST/Identity
supplicant 100=>Authenticator 310:
EAP-Response/Identity
Authenticator 310=>Authentication Server 320:
RADIUS Access-REQUEST
Authentication Server 320=>Authenticator 310:
RADIUS Access-Challenge
Authenticator 310=>supplicant 100:
EAP-REQUEST/OTP
supplicant 100=>Authenticator 310:
EAP-Response/OTP
Authenticator 310=>Authentication Server 320:
RADIUS Access-REQUEST
Authentication Server 320=>Authenticator 310:
RADIUS Access-Accept
Authenticator 310=>supplicant 100:
EAP-Success In a case of success in authentication, the Authentication Server 320, as shown in FIG. 11, notifies access control information of a user in question to the control server 300. The notified access control information is held in the access control information management unit 305 of the Authentication Server 320.

Figure 12:
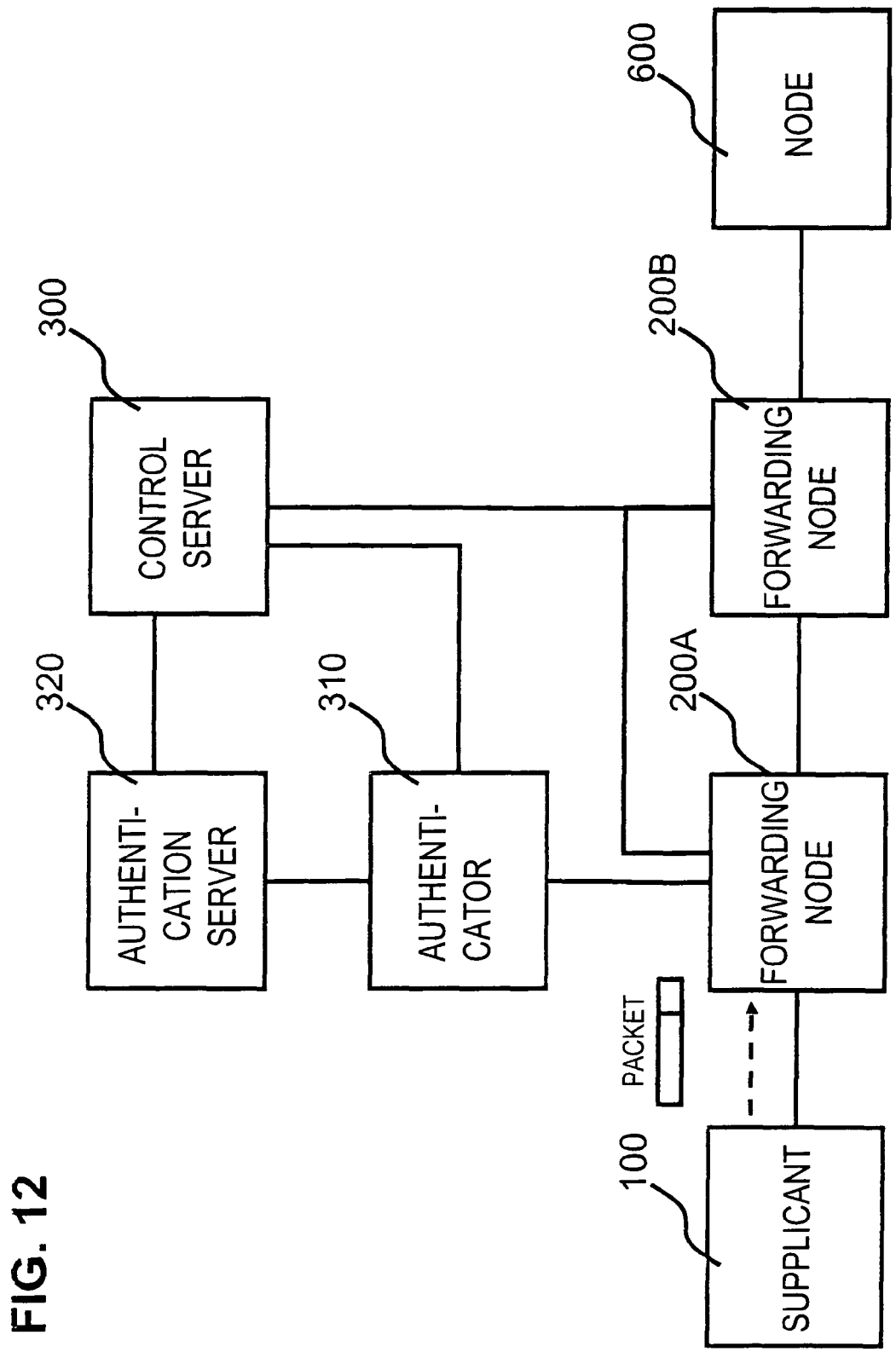
FIG. 12 is a diagram for describing operation (until authentication success) in the first exemplary embodiment of the present invention.

FIG. 12 shows a state where the supplicant 100 for which the authentication has succeeded transmits a packet with a destination of node 600 as a target. At this point in time, a processing rule matching the packet with a destination of the node 600 is not set in the forwarding node 200A (the same applies to forwarding node 200B).

Figure 13:
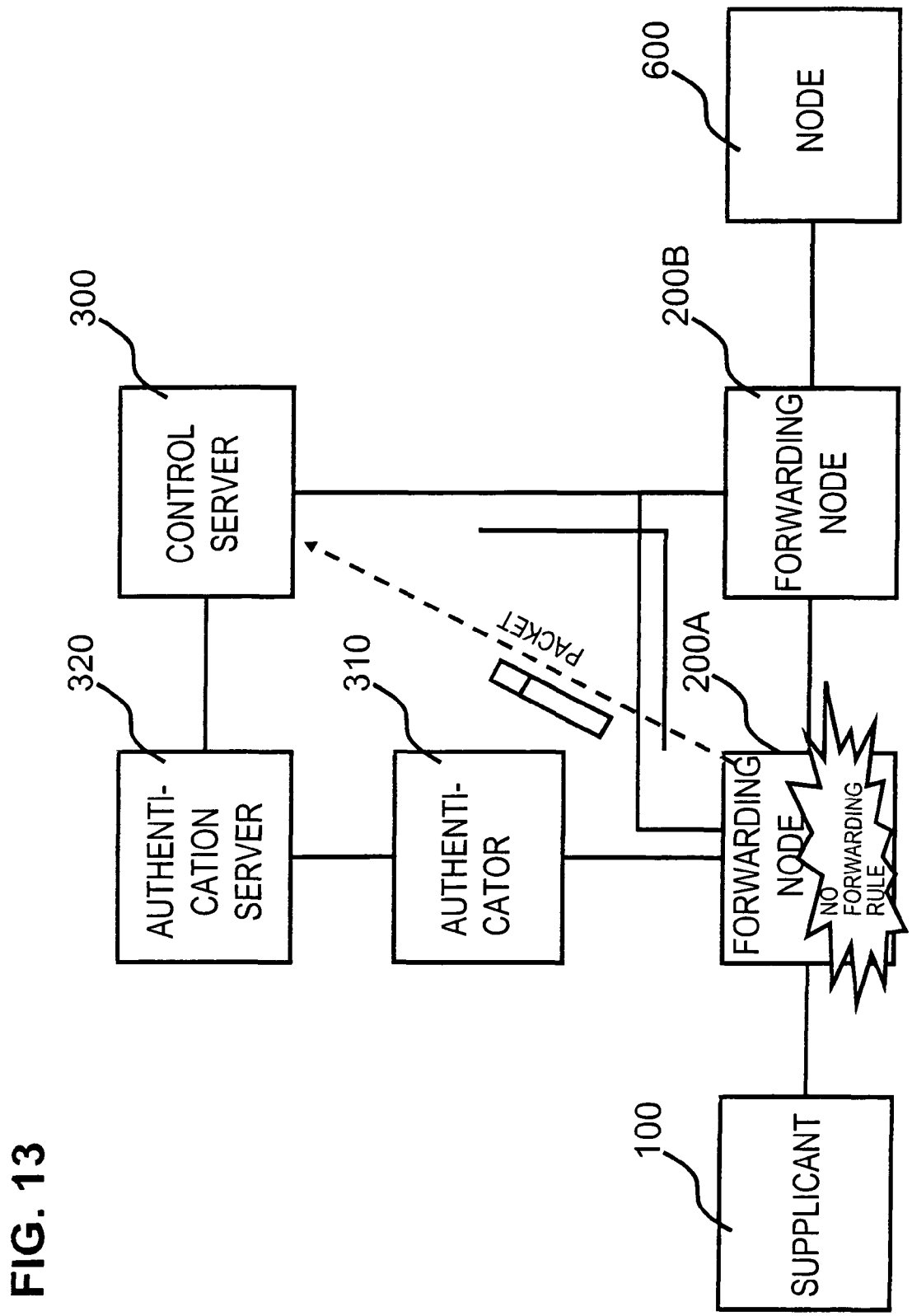
FIG. 13 is a continuing diagram of FIG. 11.

As a result, the forwarding node 200A that receives the packet, as shown in FIG. 13, transmits the packet in question to the control server 300, and requests creation of a path and setting of a processing rule.

The control server 300, which receives the request to set the processing rule, first refers to access control information held in the access control information management unit 305, and confirms whether or not a user who is the transmission source has authorization to communicate with the node 600. Here, in a case where the user who is the transmission source does not have authorization to communicate with the node 600, creation of a subsequent forwarding path is not performed, and the packet in question is dropped.

On the other hand, as a result of confirming the access control information, in a case where it is confirmed that the user who is the transmission source has authorization to communicate with the node 600, the control server 300 refers to the network topology, calculates a forwarding path from the supplicant 100 to the node 600, and creates a processing rule to be set in each of the forwarding nodes 200A and 200B in order to realize the forwarding path in question.

Here, a forwarding path (second forwarding path) from the supplicant 100, via the forwarding node 200A and the forwarding node 200B, to the node 600 is calculated. At this time, with regard to the forwarding node 200A on the left side of FIG. 13, in a case of receiving a packet from (a port connected to) the supplicant 100, with the node 600 as a destination, the control server 300 creates a processing rule determining an action for forwarding from a port connected to the forwarding node 200B on the right side of FIG. 13, and in a case of receiving a packet from the node 600 with the supplicant 100 as a destination from (a port connected to) the forwarding node 200B on the right side of FIG. 13, creates a processing rule determining an action for forwarding with the supplicant 100 as a destination (Ether DA in FIG. 4).

In the same way with regard to the forwarding node 200B on the right side of FIG. 13, in a case where the supplicant 100 receives a packet with the node 600 as a destination from (a port connected to) the forwarding node 200A on the left side of FIG. 13, the control server 300 creates a processing rule determining an action for forwarding from a port connected to the node 600, and in a case of receiving a packet with the supplicant 100 as a destination from (a port connected to) the node 600, creates a processing rule determining an action for forwarding from a port connected to the forwarding node 200A on the left side of FIG. 13.

Figure 14:
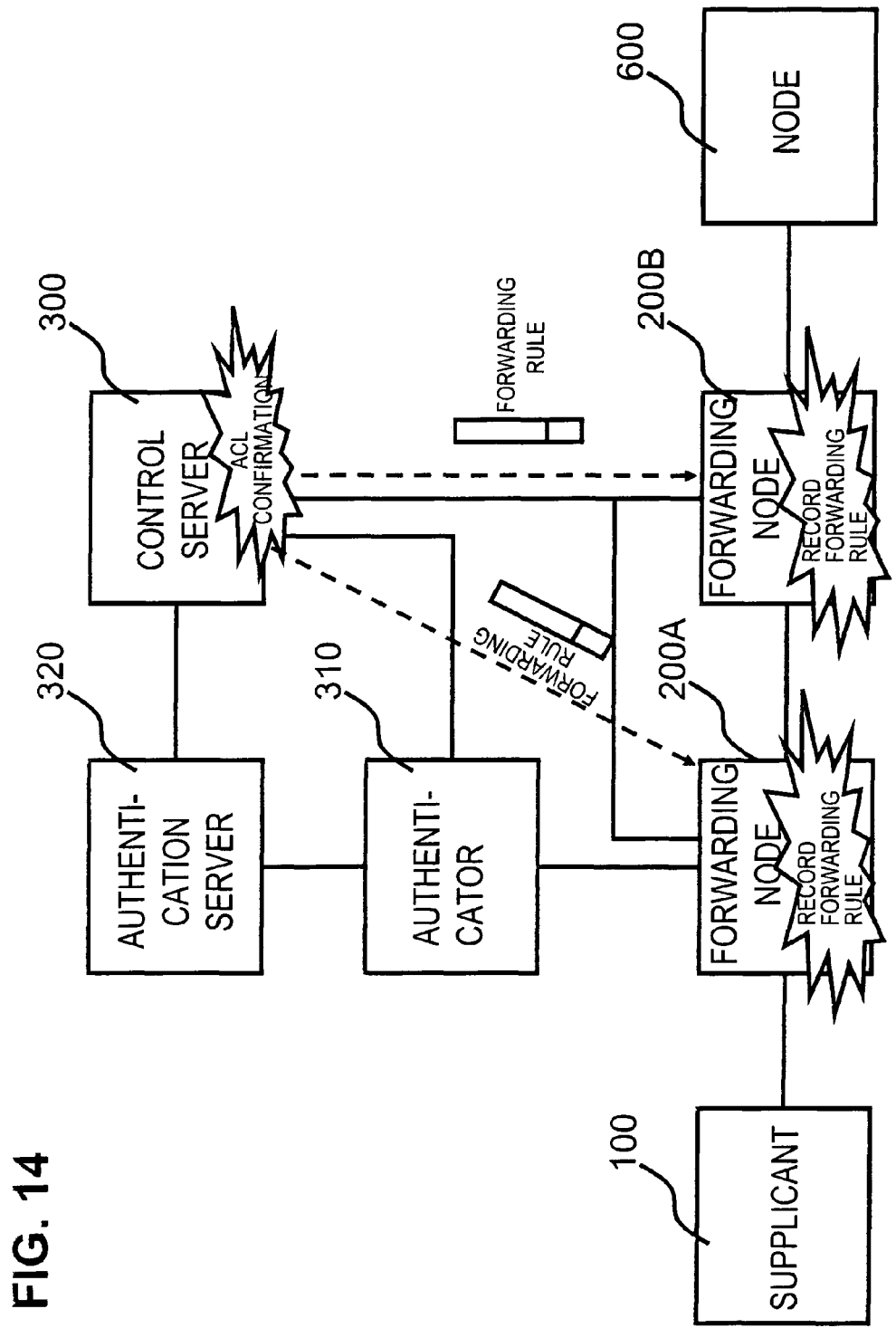
FIG. 14 is a continuing diagram of FIG. 12.

As shown in FIG. 14, when the control server 300 transmits the processing rule created as described above to the forwarding nodes 200A and 200B, the forwarding node 200A records the received processing rule in the processing rule recording unit 203, and forwards the packet received from the supplicant 100 to the forwarding node 200B. In the same way the forwarding node 200B records the received processing rule in the processing rule recording unit 203, and forwards the packet received from the forwarding node 200A to the node 600.

It is to be noted that in the example of FIG. 14, the control server 300 transmits processing rules at the same time to the forwarding nodes 200A and 200B in the forwarding path, but may transmit a processing rule to only the forwarding node 200A on receiving a request to set a processing rule. In this case, the forwarding node 200B that receives the packet in question makes a request to the control server 300 again to set a processing rule.

Figure 15:
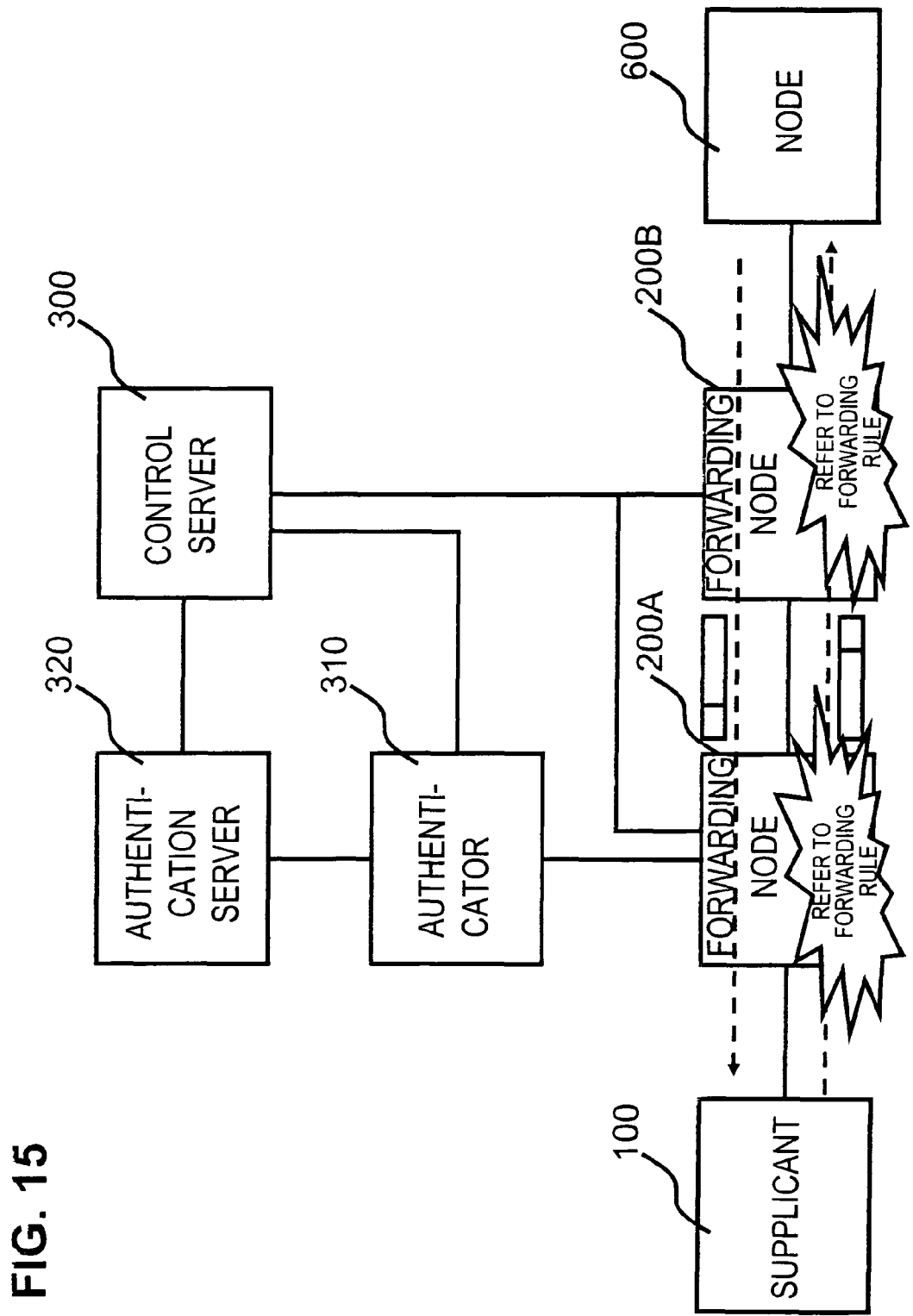
FIG. 15 is a continuing diagram of FIG. 13.

As described above, when processing rules are set in the forwarding nodes 200A and 200B in the forwarding path, as shown in FIG. 15, a state occurs in which packet communication is possible between the supplicant 100 and the node 600, via the forwarding nodes 200A and 200B.

Thereafter, when the supplicant 100 transmits a packet including an EAPoL-Logoff frame, the packet in question reaches the Authentication Server 320 via the forwarding node 200A and the Authenticator 310. The Authentication Server 320 that receives the EAPoL-Logoff frame gives notification of connection release to the control server 300. The control server 300 that receives the notification instructs the forwarding nodes 200A and 200B on the forwarding path in question to delete the processing rule in question. According to the above, packet communication thereafter is cut off.

As described above, according to the present exemplary embodiment, the forwarding node 200A is actuated similarly to the EAPoL pass switch, and after an authentication success, it is possible to perform a forwarding operation in accordance with access control information.

It is to be noted that in the present exemplary embodiment a description has been given in which the supplicant 100 initially transmits a packet to the forwarding node 200A, but in a case where the supplicant 100 is connected to the forwarding node 200B and transmits a packet, a forwarding path (another second forwarding path) linked in the order of the forwarding node 200B, the forwarding node 200A and the Authenticator 310 can be set, and authentication performed. That is, according to the present invention, it is possible to have an arbitrary forwarding node 200 as an EAPoL pass switch shown in FIG. 21, (refer to the EAPoL pass switch 904 of FIG. 21), and to set a path with the Authenticator 310, and further, by using such arbitrary forwarding nodes 200, it is possible to realize a forwarding path with a target node.

(Second Exemplary Embodiment)

Figure 16:
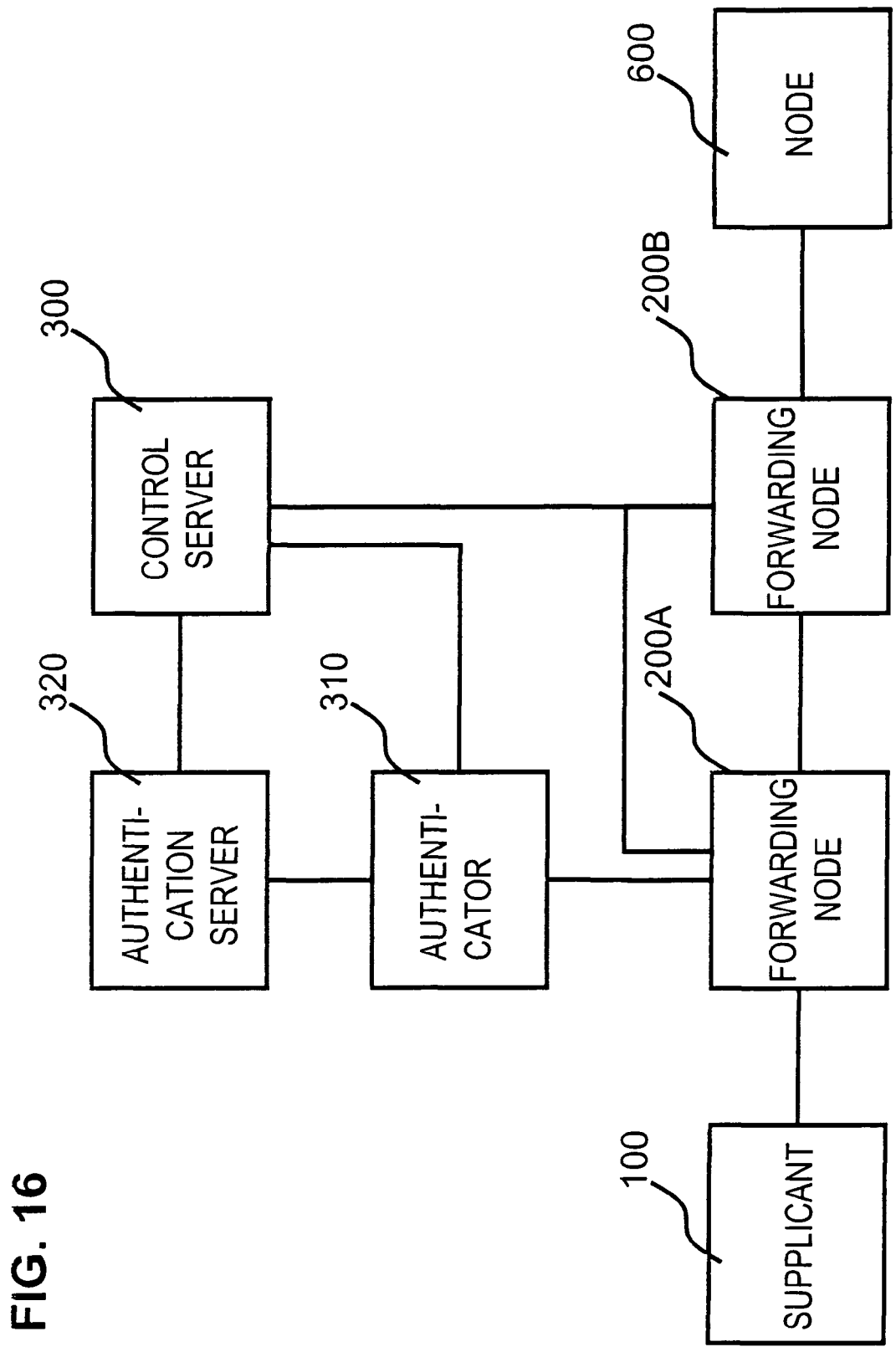
FIG. 16 is a block diagram representing a configuration of a second exemplary embodiment of the present invention.

Next, a detailed description is given concerning a second exemplary embodiment of the present invention, making reference to the drawings. FIG. 16 is a block diagram representing a configuration of the second exemplary embodiment of the present invention. A point of difference from the first exemplary embodiment represented in FIG. 2 is the point that a forwarding node 200A and an Authenticator 310 are not directly connected. In the present exemplary embodiment, since the only difference is a forwarding path of a packet that includes information that this is an authentication packet, and configuration and operation are otherwise the same as the first exemplary embodiment, a description is given centered on the following point of difference.

The forwarding node 200A that receives a packet including information that this is an authentication packet transmits the packet in question to a control server 300, and operations up to requesting creation of a path and setting of a processing rule are the same as the first exemplary embodiment described above.

Figure 17:
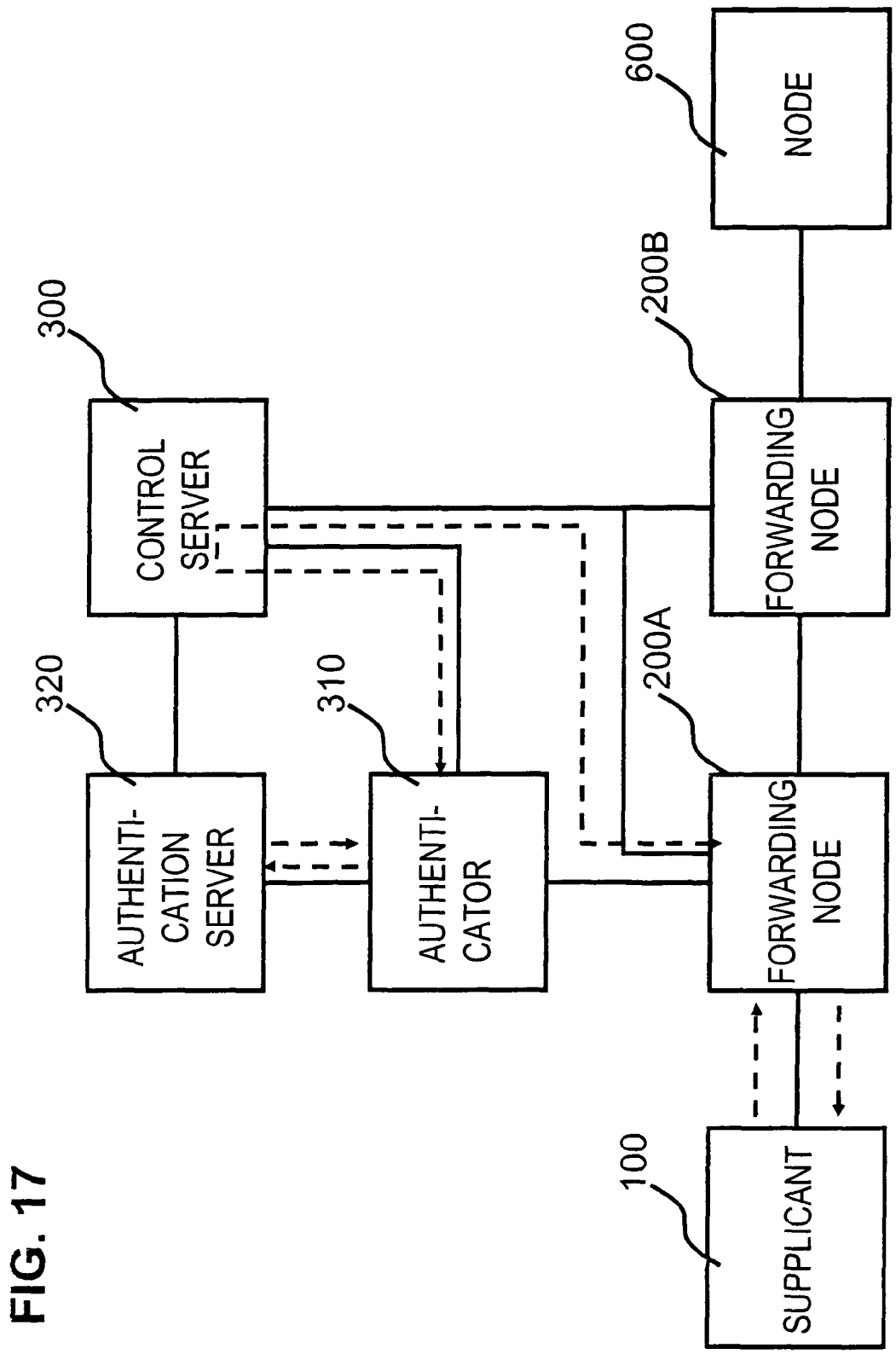
FIG. 17 is a diagram for describing operation (until authentication success) in the second exemplary embodiment of the present invention.

The control server 300 that receives a request to set the processing rule, as shown in FIG. 17, creates a forwarding path reaching an Authenticator 310, in the order of a supplicant 100, the forwarding node 200A, and the control server 300, and creates a processing rule realizing the forwarding path.

That is, with regard to a forwarding node 200A on the left side of FIG. 17, in a case of receiving a packet including the information that this is an authentication packet from the supplicant 100, the control server 300 creates a processing rule determining an action for forwarding to the control server 300, and in a case of receiving a packet including the information that this is an authentication packet of the supplicant 100 from the control server 300, creates a processing rule determining an action for forwarding with the supplicant 100 as a destination (Ether DA in FIG. 4). Furthermore, the control server 300 performs an operation of relaying a packet including the information that this is an authentication packet received and transmitted between the Authenticator 310 and the forwarding node 200A.

Since operations after success in the authentication are the same as in the first exemplary embodiment described above, following descriptions are omitted.

(Third Exemplary Embodiment)

Figure 18:
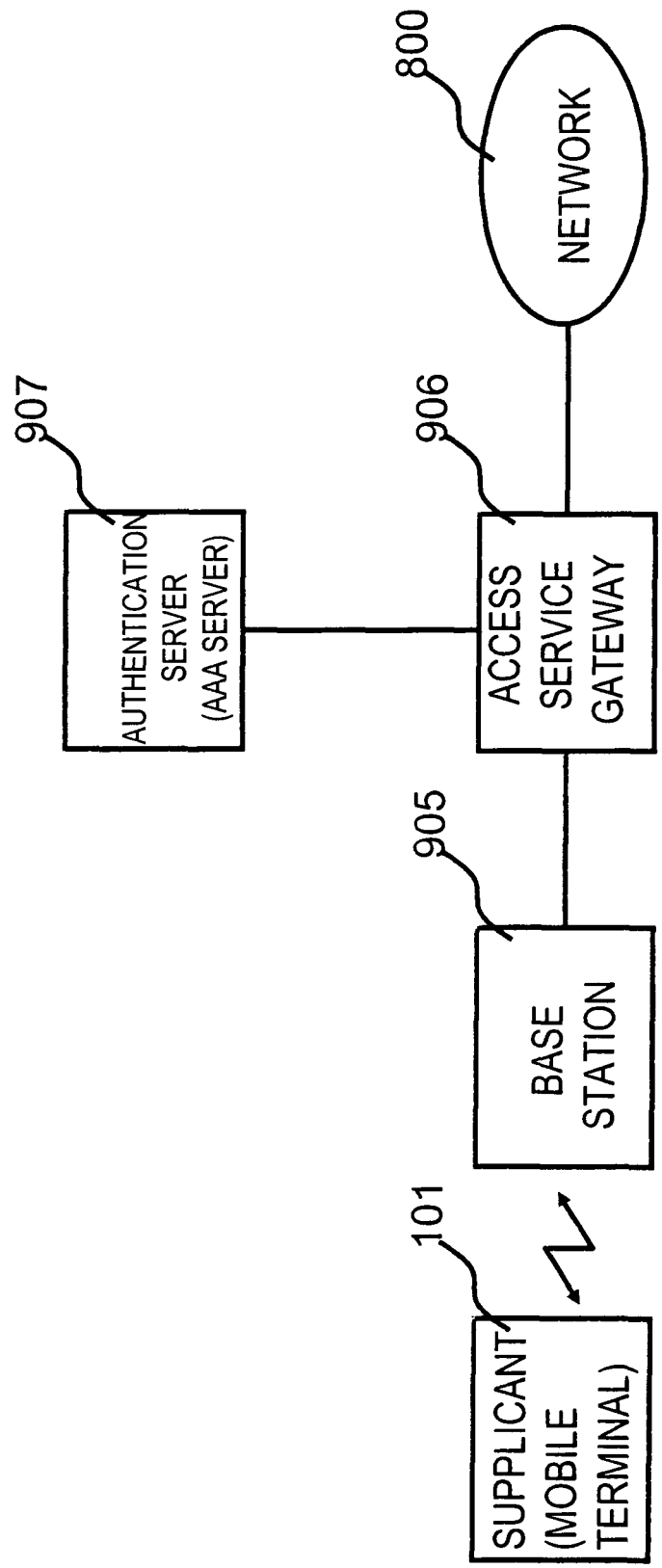
FIG. 18 is a diagram representing an authentication system in a WiMAX network.

The present invention can also correspond to various types of other network configurations. For example, a network can also be configured that operates similarly to an authentication system in a WiMAX network shown in FIG. 18.

Figure 19:
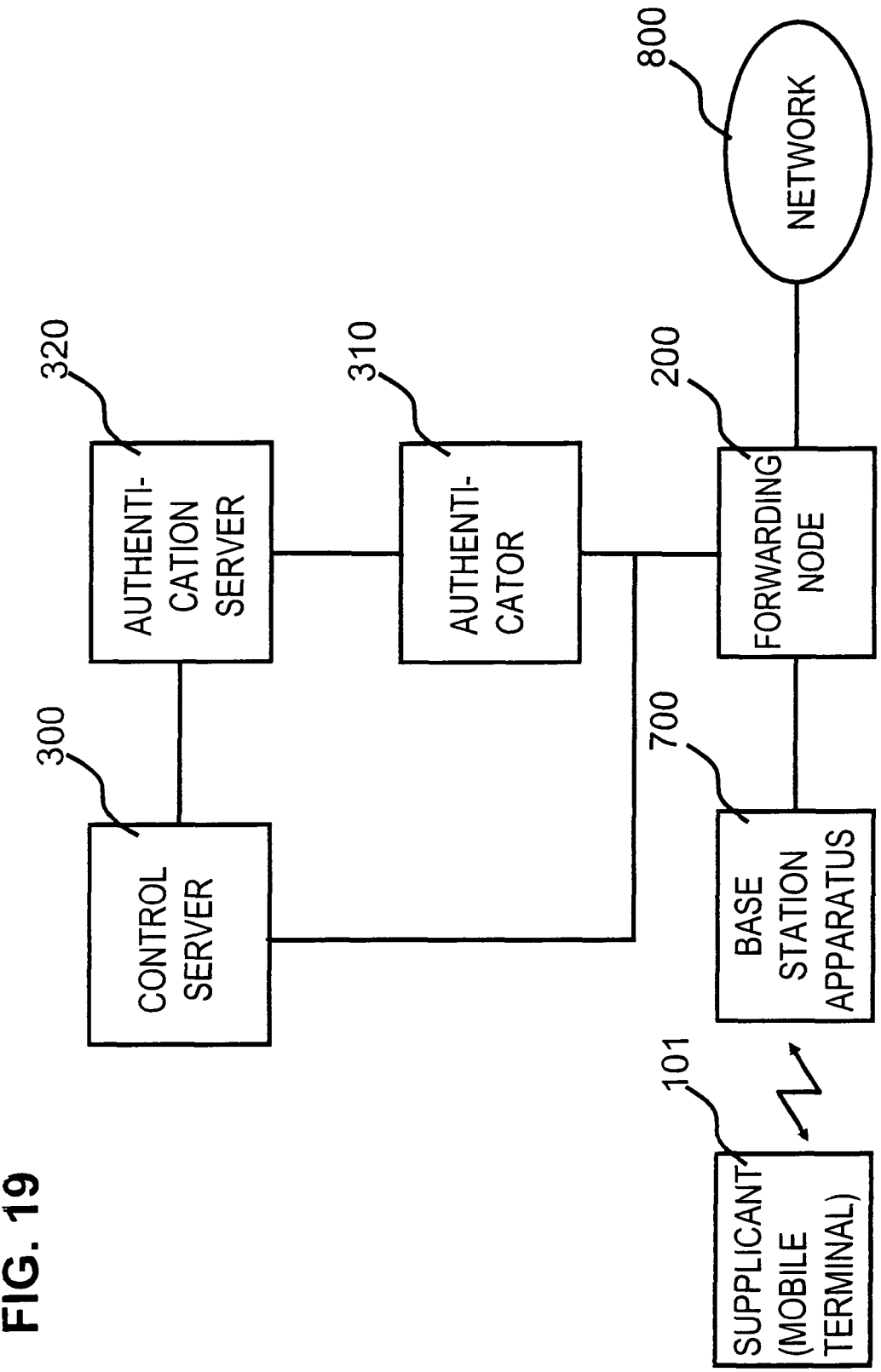
FIG. 19 is a block diagram representing a configuration of a third exemplary embodiment of the present invention.

FIG. 19 is a diagram representing a configuration of a third exemplary embodiment in which the present invention is applied to a mobile communication network. A supplicant 101 of FIG. 19 is a mobile terminal, and by using a configuration of a forwarding node 200 and following, it is possible to perform authentication processing in a case of trying to connect to a network 800 via a basic station apparatus 700. In this case also, the forwarding node 200 forwards a packet including information that this is an authentication packet to an Authenticator 310. When the supplicant 101 succeeds in authentication, by interaction with an Authentication Server 320, access control information is notified to a control server 300.

Thereafter, by the control server 300 setting a processing rule allowing packet forwarding to the network 800, in the forwarding node 200, it is possible for the supplicant 101 to access the network 800. In this regard, similar to an Authentication Server (AAA server) 907 of FIG. 18, authentication, authorization, and accounting may be performed.

A description has been given above of preferred exemplary embodiments of the present invention and specific operations thereof, but the present invention is not limited to the abovementioned exemplary embodiments, and further modifications, substitutions, and adjustments can be added within a scope that does not depart from a fundamental technological concept of the present invention.

For example, in the abovementioned exemplary embodiments, a description was given citing examples in which there is 1 or 2 forwarding nodes, but the number of forwarding nodes is not particularly limited. By setting a processing rule in each of the forwarding nodes, it is clearly possible with regard to a forwarding node to have an operation equivalent to a switch forwarding only a specific authentication flow towards an Authenticator, and to have an operation equivalent to a switch performing complicated flow control in accordance with access control information.

Furthermore, for example, in the abovementioned exemplary embodiments a description has been given in which the control server 300 and the Authentication Server 320 are each independent, but an embodiment in which these are unified is also possible.

Modifications and adjustments of embodiments and examples are possible within the bounds of the entire disclosure (including the scope of the claims) of the present invention, and also based on fundamental technological concepts thereof. Furthermore, a wide variety of combinations and selections of various disclosed elements is possible within the scope of the claims of the present invention. That is, the present invention clearly includes every type of transformation and modification that a person skilled in the art can realize according to the entire disclosure including the scope of the claims and to technological concepts thereof.

The invention claimed is:

1. A control server, wherein said control server is connected to:
   a forwarding node that executes processing a packet between a supplicant and a prescribed authentication device, in accordance with a set processing rule, and
   an authentication device that performs a prescribed authentication procedure with said supplicant via said forwarding node, and gives notification of a result thereof to a control server;
   wherein said control server creates a first forwarding path between said supplicant and a destination node, in a case where an authentication procedure with said authentication device succeeds, and sets a processing rule for a packet received or transmitted between said supplicant and destination node following said first forwarding path, in at least one forwarding node in said first forwarding path,
   wherein said control server creates a second forwarding path between said supplicant and said prescribed authentication device, in a case where a packet for which a processing rule is unknown, transmitted from said forwarding node, includes information that the packet comprises an authentication packet, and with regard to at least a forwarding node that is a source of said forwarded packet, thereafter transmits a processing rule to be applied by said forwarding node to an authentication packet received or transmitted between a supplicant and a prescribed authentication device.

2. The control server according to claim 1, wherein said control server uses an access policy or access control list transmitted as notification of said authentication result from said authentication device to determine whether or not to create a first forwarding path for a packet for which an enquiry was received from said forwarding device.

3. The control server according to claim 1, wherein said control server creates a path via the authentication device, as a second forwarding path; and
   participates in a relay of said authentication packet.

4. The control server according to claim 1, wherein
in a case of receiving a connection release request from said supplicant, via said authentication device, gives an instruction to delete a processing rule corresponding to a first forwarding path created for a packet from said supplicant, to a forwarding node on said first forwarding path.

5. A communication method, comprising:
execute processing, by a forwarding node, of a packet between a supplicant and a prescribed authentication device, in accordance with a set processing rule;
performing, by said authentication device, a prescribed authentication procedure with said supplicant via said forwarding node, and gives notification of a result thereof to a control server;
creating, by said control server, a first forwarding path between said supplicant and a destination node, in a case where an authentication procedure with said authentication device succeeds;
setting, by said control server, a processing rule for a packet received or transmitted between said supplicant and destination node following said first forwarding path, in at least one forwarding node in said first forwarding path; and
creating, by said control server, a second forwarding path between said supplicant and said prescribed authentication device, in a case where a packet for which a processing rule is unknown, transmitted from said forwarding node, includes information that the packet comprises an authentication packet, and with regard to at least a forwarding node that is a source of said forwarded packet, thereafter transmits a processing rule to be applied by said forwarding node to an authentication packet received or transmitted between a supplicant and a prescribed authentication device.

6. A computer program stored in a non-transitory computer readable medium, executed in a computer forming a control server connected to a forwarding node that processes a packet between a supplicant and a prescribed authentication device, in accordance with a set processing rule, and to an authentication device that performs a prescribed authentication procedure with a supplicant via said forwarding node, said computer program executing a method comprising:
a process of creating a first forwarding path between said supplicant and a destination node, in a case where a result of an authentication procedure notified by said authentication device is to notify that an authentication procedure with said authentication device has succeeded, and setting a processing rule of a packet received or transmitted between said supplicant and destination node following said first forwarding path, in at least one forwarding node in said first forwarding path;
creating a second forwarding path between said supplicant and said prescribed authentication device, in a case where a packet for which a processing rule is unknown, transmitted from said forwarding node, includes information that the packet comprises an authentication packet, and with regard to at least a forwarding node that is a source of said forwarded packet; and
thereafter transmitting a processing rule to be applied by said forwarding node to an authentication packet received or transmitted between a supplicant and a prescribed authentication device.

7. An authentication device, wherein said authentication device is connected to a forwarding node that processes a packet between a supplicant and a prescribed authentication device in accordance with a set processing rule, and to a control server that sets said processing rule in said forwarding node; and wherein
said authentication device performs a prescribed authentication procedure with said supplicant via said forwarding node and gives notification of a result thereof to said control server,
wherein said forwarding node includes a unit that forwards a received packet for which a processing rule is unknown, to the control server, and the control server performs access control for each supplicant and the prescribed authentication device without access of the authentication device at each location.

8. A computer program stored in a non-transitory computer readable medium, executed in a computer forming a control server connected to a forwarding node that processes a packet between a supplicant and a prescribed authentication device, in accordance with a set processing rule, and to an authentication device that performs a prescribed authentication procedure with a supplicant via said forwarding node, said computer program executing a method comprising:
a process of creating a first forwarding path between said supplicant and a destination node, in a case where a result of an authentication procedure notified by said authentication device is to notify that an authentication procedure with said authentication device has succeeded, and setting a processing rule of a packet received or transmitted between said supplicant and destination node following said first forwarding path, in at least one forwarding node in said first forwarding path,
wherein said forwarding node includes a unit that forwards a received packet for which a processing rule is unknown, to the control server, and the control server performs access control for each supplicant and the prescribed authentication device without access of the authentication device at each location.

* * * * *